(12) United States Patent
Takao

(10) Patent No.: US 11,275,917 B2
(45) Date of Patent: Mar. 15, 2022

(54) READING DEVICE, READING METHOD, READING PROGRAM, AND SETTLEMENT PROCESSING METHOD

(71) Applicant: FUJIFILM Corporation, Tokyo (JP)

(72) Inventor: Ryo Takao, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/144,480

(22) Filed: Jan. 8, 2021

(65) Prior Publication Data
US 2021/0133413 A1 May 6, 2021

Related U.S. Application Data

(63) Continuation of application No. PCT/JP2019/033495, filed on Aug. 27, 2019.

(30) Foreign Application Priority Data

Dec. 20, 2018 (JP) .............................. JP2018-238617

(51) Int. Cl.
*G06K 7/14* (2006.01)

(52) U.S. Cl.
CPC ......... *G06K 7/1491* (2013.01); *G06K 7/1417* (2013.01); *G06K 7/1456* (2013.01); *G06K 7/1473* (2013.01)

(58) Field of Classification Search
CPC .. G06K 7/1491; G06K 7/1417; G06K 7/1456; G06K 7/1473; G06K 7/10; G06K 7/14; G06K 19/06
See application file for complete search history.

(56) References Cited

U.S. PATENT DOCUMENTS

| 2006/0022059 A1 | 2/2006 | Juds |
| 2006/0250925 A1 | 11/2006 | Teraoka et al. |
| 2012/0211567 A1* | 8/2012 | Herzig .................... G06F 17/00 235/488 |
| 2016/0042262 A1 | 2/2016 | Tanaka et al. |

FOREIGN PATENT DOCUMENTS

| EP | 3 066 612 A1 | 9/2016 |
| EP | 3 066 612 B1 | 1/2019 |
| JP | 2006-292989 A | 10/2006 |
| JP | 2012-164234 A | 8/2012 |

(Continued)

OTHER PUBLICATIONS

International Search Report issued in PCT/JP2019/033495; dated Nov. 12, 2019.

(Continued)

*Primary Examiner* — Matthew Mikels
(74) *Attorney, Agent, or Firm* — Studebaker & Brackett PC

(57) ABSTRACT

A reading device, a reading method and a reading program that can easily and quickly read a composite symbol, and a settlement processing method are provided. A moving image of a composite symbol which includes a plurality of symbols emerging in the same location and whose appearance changes depending on a viewing angle, is captured. The symbols included in the composite symbol are detected from the moving image obtained by image-capturing. Authenticity of the composite symbol is determined based on the obtained moving image.

12 Claims, 22 Drawing Sheets

(56) References Cited

FOREIGN PATENT DOCUMENTS

| | | |
|---|---|---|
| JP | 2012-164236 A | 8/2012 |
| JP | 2013-022739 A | 2/2013 |
| JP | 2015-084200 A | 4/2015 |
| JP | 2017-045161 A | 3/2017 |
| JP | 2017-054290 A | 3/2017 |
| WO | 2015/067725 A1 | 5/2015 |

OTHER PUBLICATIONS

Written Opinion issued in PCT/JP2019/033495; dated Nov. 12, 2019.
An Office Action; "Decision of Dismissal of Amendment," issued by the Japanese Patent Office dated Apr. 2, 2020, which corresponds to Japanese Patent Application No. 2018-238617.
An Office Action; "Decision to Grant a Patent," issued by the Japanese Patent Office dated Aug. 28, 2020, which corresponds to Japanese Patent Application No. 2018-238617.
An Office Action; "Notice of Reasons for Refusal," issued by the Japanese Patent Office dated Jul. 3, 2019, which corresponds to Japanese Patent Application No. 2018-238617.
An Office Action; "Notice of Reasons for Refusal," issued by the Japanese Patent Office dated Nov. 7, 2019, which corresponds to Japanese Patent Application No. 2018-238617.
The extended European search report issued by the European Patent Office dated Jan. 24, 2022, which corresponds to European Patent Application No. 19900812.9-1202 and is related to U.S. Appl. No. 17/144,480.

\* cited by examiner

READING DEVICE, READING METHOD, READING PROGRAM, AND SETTLEMENT PROCESSING METHOD

CROSS-REFERENCE TO RELATED APPLICATIONS

The present application is a Continuation of PCT International Application No. PCT/JP2019/033495 filed on Aug. 27, 2019 claiming priority under 35 U.S.C § 119(a) to Japanese Patent Application No. 2018-238617 filed on Dec. 20, 2018. Each of the above applications is hereby expressly incorporated by reference, in its entirety, into the present application.

BACKGROUND OF THE INVENTION

1. Field of the Invention

The present invention relates to a composite symbol in which a plurality of symbols emerge in the same location and an appearance of the symbol changes depending on a viewing angle, and a reading device, a reading method and a reading program, and a settlement processing method which read the composite symbol.

2. Description of the Related Art

With the spread of bar codes and two-dimensional codes, such codes (symbols) are widely used not only as means for reading information but also as means for traceability management, access control, settlement and the like. On the other hand, losses have been caused by forged codes. For example, in a system where users make settlements by reading codes with their smartphones and other devices, losses have been caused when codes displayed in stores are replaced or re-pasted with fraudulent codes.

Japanese Patent Application Laid-Open No. 2012-164236 (hereinafter referred to as "PTL 1") and Japanese Patent Application Laid-Open No. 2013-022739 (hereinafter referred to as "PTL 2") propose, as an anti-counterfeit technology for symbols, to use technology for changing an appearance depending on a viewing angle so as to allow a plurality of symbols to emerge in the same location. The symbol (composite symbol) configured so as to change its appearance depending on the viewing angle in this manner, cannot be copied by a photocopier or the like, and is difficult to manufacture. Therefore, it is possible to effectively prevent counterfeiting. In addition, since a plurality of symbols can be read, it is possible to achieve advanced authenticity determination.

By the way, in principle, when the composite symbol is read, all the symbols in the composite symbol need to be read. In the related art, an image of each of the symbols is captured and read individually. In other words, the image of each of the symbols is captured individually while changing the position of a reading device so that the appearance is switched.

CITATION LIST

Patent Literature 1: Japanese Patent Application Laid-Open No. 2012-164236
Patent Literature 2: Japanese Patent Application Laid-Open No. 2013-022739

SUMMARY OF THE INVENTION

However, a reading technique in the related art, in which the images of displayed symbols are captured and read individually, has disadvantage that image-capturing has to be repeated a plurality of times and reading has been time-consuming.

In view of such circumstances, the present invention aims to provide a reading device, a reading method and a reading program, and a settlement processing method that can easily and quickly read a composite symbol.

The solutions to the above problem are as follows.

(1) A reading device including: a moving image acquisition unit configured to acquire a moving image captured while moving or changing an angle relative to a composite symbol in which a plurality of symbols appear in the same position so as to switch its appearance depending on a viewing angle; a symbol detection unit configured to detect the symbols from the moving image; and an authenticity determination unit configured to determine authenticity of the composite symbol based on the moving image.

(2) The reading device according to (1) given above, in which the authenticity determination unit determines authenticity of the composite symbol based on a sequential order of the symbols detected from the moving image in chronological order.

(3) The reading device according to (1) or (2) given above, in which the authenticity determination unit determines authenticity of the composite symbol based on switching transition of the symbols detected from the moving image.

(4) The reading device according to any one of (1) to (3) given above, in which an emergence ratio of each of the symbols differs in a case where the composite symbol is viewed while continuously changing an angle at a constant speed, and the authenticity determination unit determines the authenticity of the composite symbol based on the emergence ratio of each of the symbols detected from the moving image.

(5) The reading device according to any one of (1) to (4) given above, further including a symbol number information acquisition unit configured to acquire information on the number of symbols included in the composite symbol, and the symbol detection unit terminates detection process in a case where all the symbols included in the composite symbol are detected.

(6) The reading device according to (5) given above, in which, in a case where the information on the number of symbols included in the composite symbol is stored in the symbols, the symbol number information acquisition unit acquires from the symbols, the information on the number of symbols included in the composite symbol.

(7) The reading device according to any one of (1) to (6) given above, in which, in a case where color of the symbols switches according to switching of the symbols, the symbol detection unit detects switching of the color of the symbols from the moving image to detect the symbols.

(8) The reading device according to any one of (1) to (6) given above, in which, in a case where a chart changes according to switching of the symbols, is disposed adjacent to the composite symbol, the symbol detection unit detects the symbols by detecting the switching of the chart.

(9) The reading device according to (8) given above, in which color of the chart changes according to the switching of the symbols.

(10) The reading device according to any one of (1) to (9) given above, further including a display unit configured to display the moving image, in which a frame enclosing the composite symbol is superimposed on the moving image on the display unit.

(11) The reading device according to any one of (1) to (10) given above, in which the symbol includes a code.

(12) The reading device of any one of (1) to (11) given above, in which the appearance of the composite symbol is changed depending on the viewing angle by a lenticular lens sheet or a microlens array sheet.

(13) A reading method including: acquiring a moving image captured while moving or changing an angle relative to a composite symbol in which a plurality of symbols appear in the same position so as to switch its appearance depending on a viewing angle; detecting the symbols from the moving image; and determining authenticity of the composite symbol based on the moving image.

(14) A reading program for making a computer to execute: a function for acquiring a moving image captured while moving or changing an angle relative to a composite symbol in which a plurality of symbols appear in the same position so as to switch its appearance depending on a viewing angle; a function for detecting the symbols from the moving image; and a function for determining authenticity of the composite symbol based on the moving image.

(15) A composite symbol in which a plurality of symbols appear in the same position so as to switch its appearance depending on a viewing angle, wherein, in a case where N and M are integers satisfying N>M, each of the symbols is generated from N segmented data obtained by segmenting original data into N segments, and the segmented data is generated so as to be capable of restoring the original data from the at least M segmented data.

(16) The composite symbol according to (15) given above, in which a clearance (gap) is present between symbol strips adjacent to each other in one lens.

(17) The composite symbol according to (15) or (16) given above, having a sign indicating a reading direction.

(18) The composite symbol according to any one of (15) to (17) given above, in which the symbol includes a code.

(19) A settlement processing method based on a code, including: acquiring a moving image captured while moving or changing an angle relative to a composite code, in which a plurality of codes appear in the same position so as to switch its appearance depending on a viewing angle, detecting the codes from the moving image; and determining authenticity of the composite code based on the moving image.

According to the present invention, composite symbols can be read easily and quickly.

DESCRIPTION OF THE PREFERRED EMBODIMENTS

Preferred embodiments of the present invention will be described in detail following the accompanying drawings.

[Composite Symbol]

First, a composite symbol will be described.

The composite symbol has a structure in which a plurality of symbols emerge in the same location, and its appearance changes depending on the viewing angle. Symbols may include bar codes and two-dimensional codes (e.g., QR code (registered trademark), CP codes (Computer Purpose Code), etc.), as well as signs, characters (including pictograms, etc.), figures, and designs (including patterns, etc.), etc.

Figure 1:
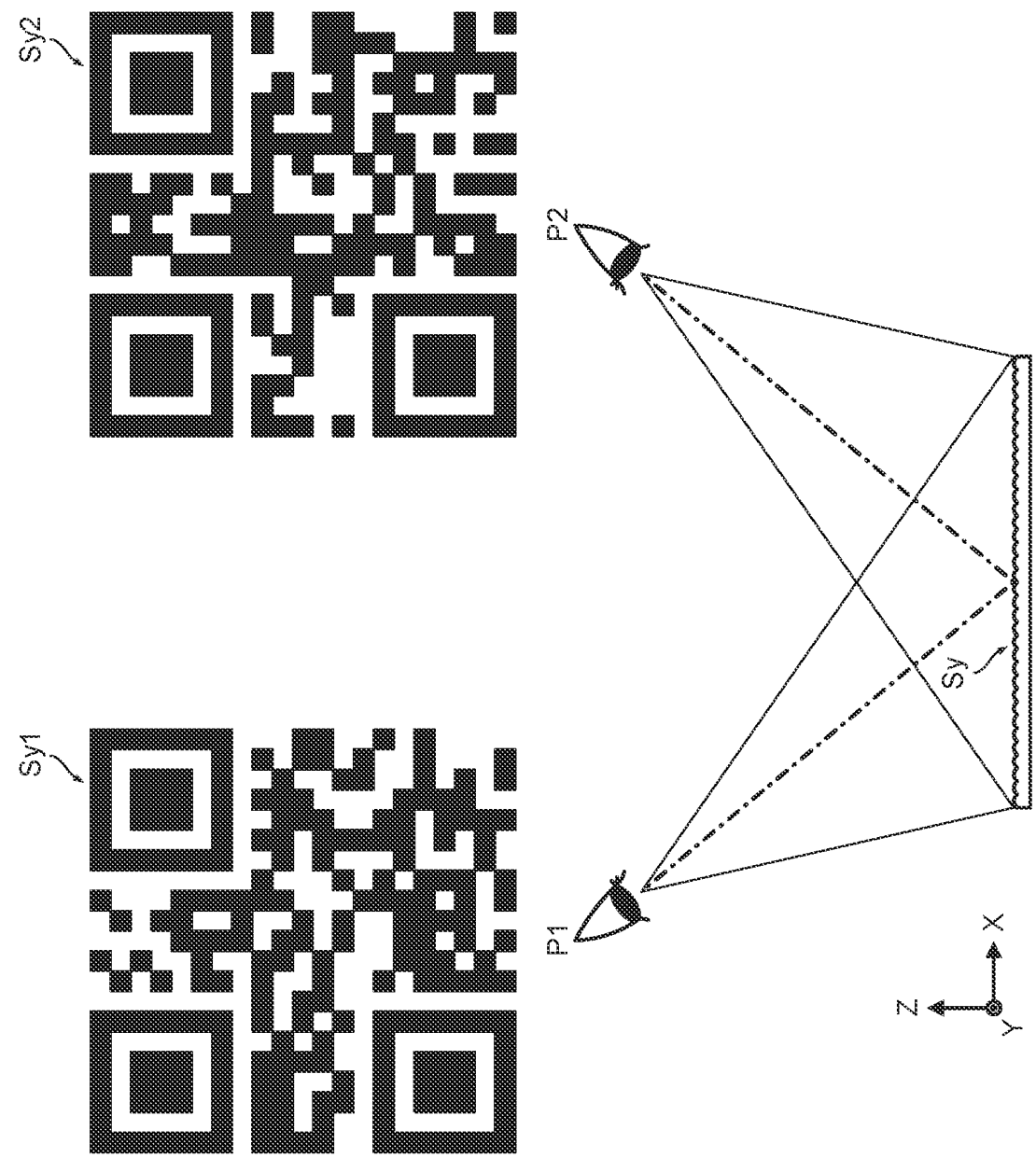
FIG. 1 is a conceptual diagram illustrating a composite symbol.

FIG. 1 is a conceptual diagram illustrating a composite symbol.

FIG. 1 illustrates an example of a case where two symbols (the first symbol Sy1, and the second symbol Sy2) are made appeared. FIG. 1 also illustrates a case of displaying two-dimensional codes (in this case, QR codes) as the symbols. FIG. 1 also illustrates an example of a case where a lenticular lens sheet is used to change an appearance. Note that, when symbols are made of codes, the composite symbol is specially referred to as a "composite code".

As illustrated in FIG. 1, when the composite symbol Sy is viewed from a first viewpoint P1, the first symbol Sy1 (first two-dimensional code) appears. When the composite symbol Sy is viewed from a second viewpoint P2, the second symbol Sy2 (second two-dimensional code) appears. Note that, in a position between the first viewpoint P1 and the second viewpoint P2, an image in which the first symbol Sy1 and the second symbol Sy are interfering with each other, appears. In this manner, the composite symbol Sy changes its appearance depending on the viewing angle.

Figure 2:
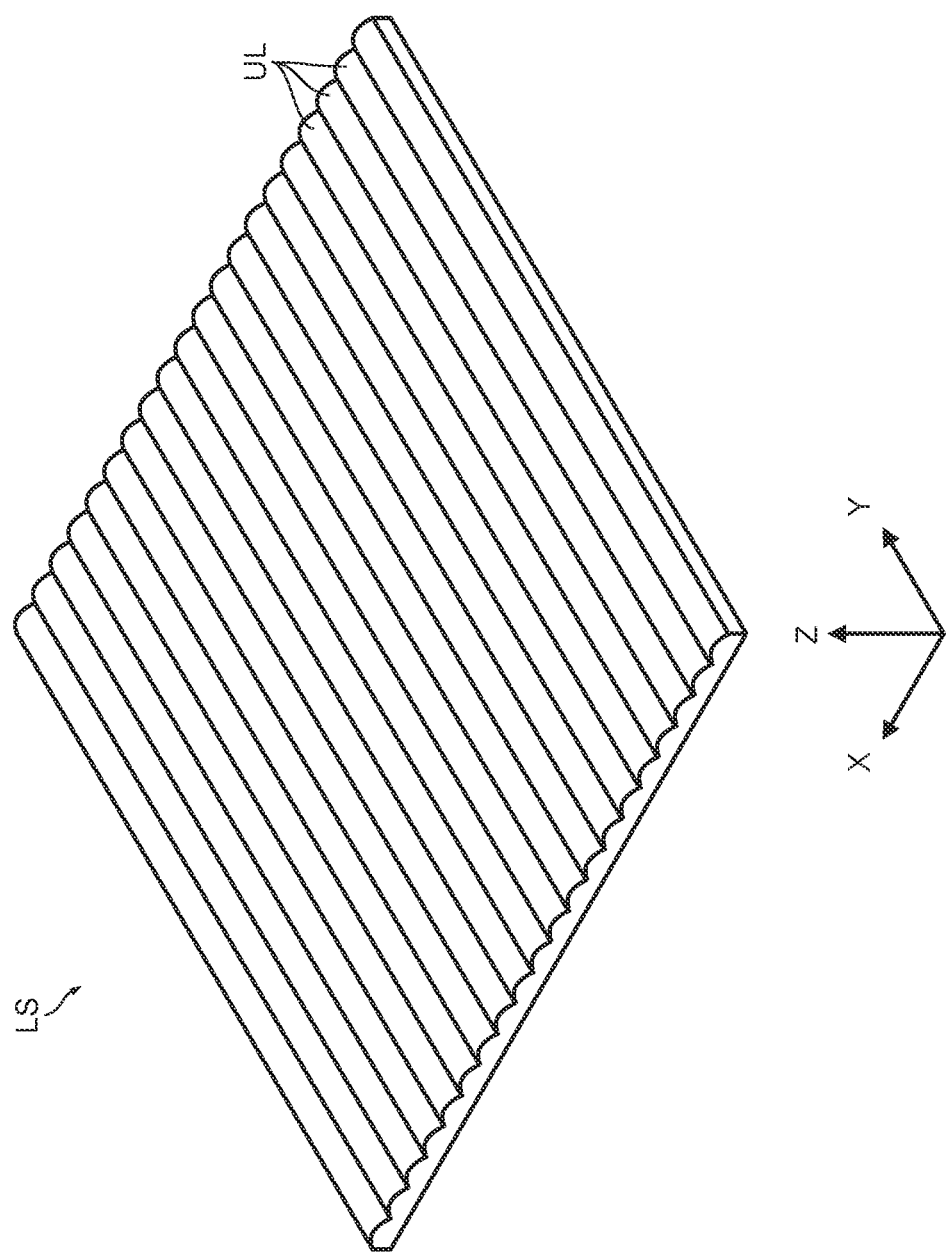
FIG. 2 is a perspective view illustrating a schematic configuration of a lenticular lens sheet.

FIG. 2 is a perspective view illustrating a schematic configuration of a lenticular lens sheet.

The lenticular lens sheet LS has a structure in which many linearly extending plane-convex (semi-cylindrical) unit lenses UL are arrayed along one direction. The direction in which the unit lens UL extends (a Y direction in the drawing) and the direction in which the unit lenses UL are arrayed (an X direction in the drawing) are mutually orthogonal. In general, the lenticular lens sheets LS are made of resin. The lenticular lens sheets LS are classified by type (lens resolution) according to the number of unit lens ULs per inch (LPI; Line Per Inch).

When a lenticular lens sheet is used, the composite symbol is generated as a lenticular print. The lenticular print is generated by generating a lenticular image in a predetermined format and directly printing the lenticular image onto the lenticular lens sheet. Alternatively, the lenticular print is generated by attaching a print on which the lenticular image is printed to the lenticular lens sheet. The lenticular image is generated by combining a plurality of symbols to be appeared, in a predetermined manner.

Figure 3:
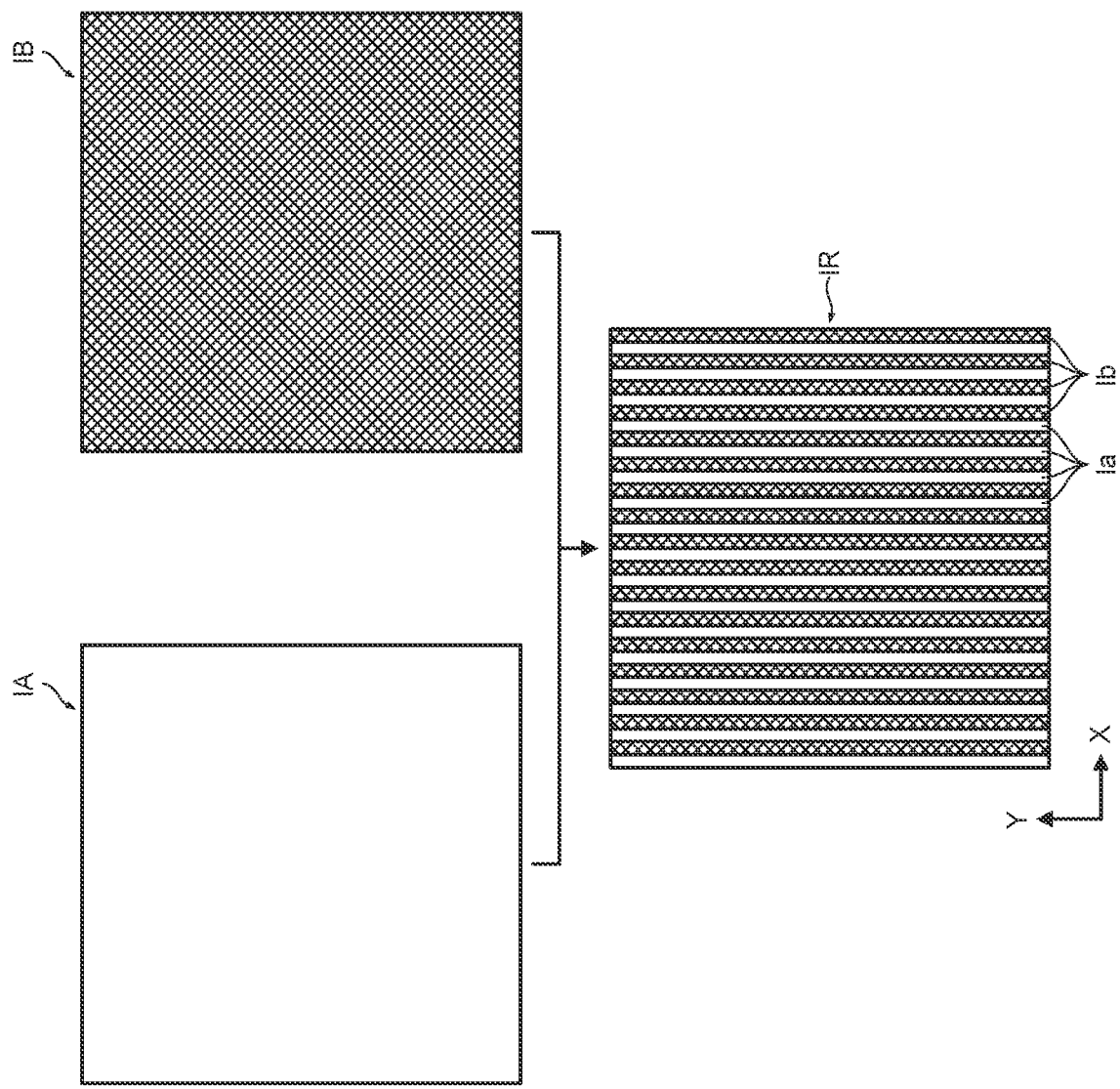
FIG. 3 is a conceptual diagram illustrating generation of a lenticular image.

FIG. 3 is a conceptual diagram illustrating generation of a lenticular image.

FIG. 3 illustrates an example of a case where two images (first image IA and second image IB) are made appeared in a switching manner. The lenticular image IR is generated by dividing the first image IA and the second image IB into band-shaped strips Ia and Ib, respectively, and arranging the divided fragments Ia and Ib in an interlaced manner. In other words, the lenticular image IR is generated by arranging the strips Ia and Ib cut out from each of the images IA and IB alternately from an edge.

Figure 4:
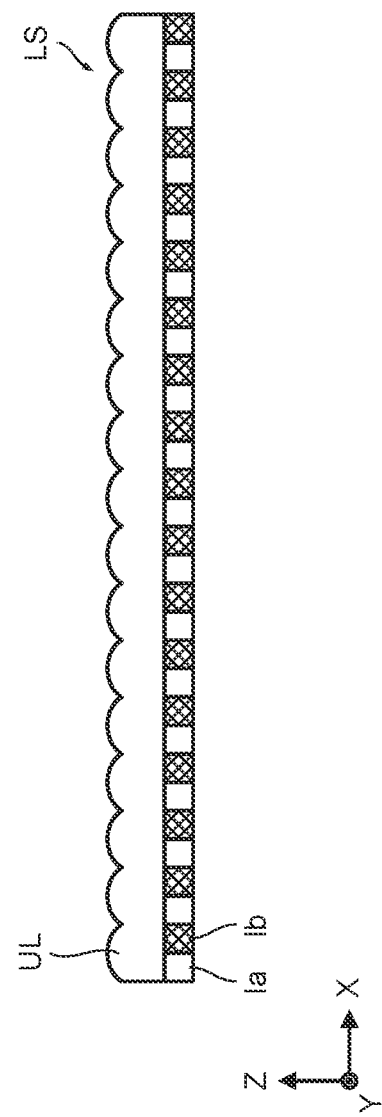
FIG. 4 is a cross-sectional view illustrating a schematic configuration of a lenticular print.

FIG. 4 is a cross-sectional view illustrating a schematic configuration of a lenticular print, and shows a relationship between the lenticular lens sheet and the lenticular image.

As illustrated in FIG. 4, in a state where one unit lens UL is placed on each of the strips Ia, Ib, the lenticular image is printed on the lenticular lens sheet LS. Alternatively, a print on which the lenticular image is printed is adhered on the lenticular lens sheet LS.

[Reading Device]

The reading device includes a computer provided with a camera (image-capturing unit). Here, an example of a case where a smartphone comprises the reading device will be described.

Figure 5:
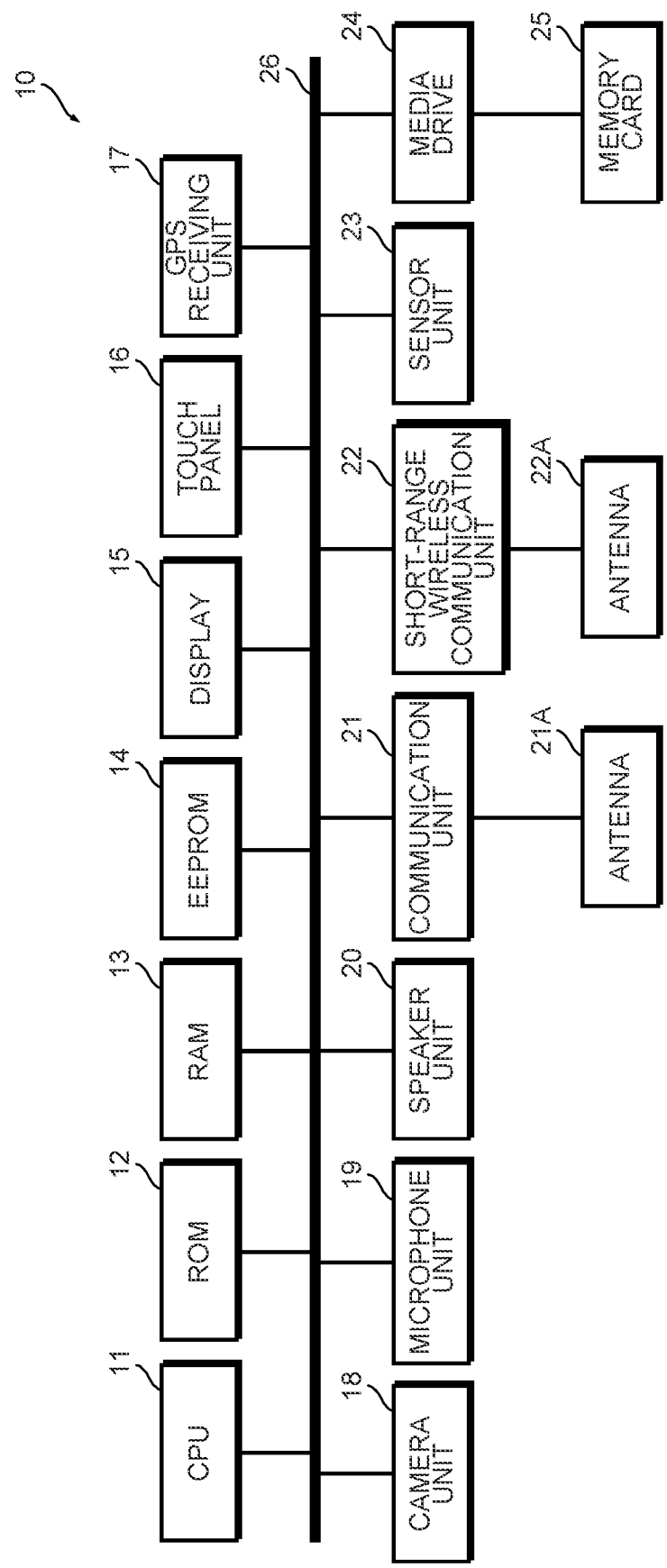
FIG. 5 is a block diagram illustrating an example of a hardware configuration of a smartphone.

FIG. 5 is a block diagram illustrating an example of a hardware configuration of the smartphone.

As illustrated in FIG. 5, the smartphone 10 incudes: a CPU 11 configured to control an overall operation; a ROM 12 which stores a basic input/output program and the like; a RAM 13 to be used as a work area of the CPU 11; an EEPROM (Electrically Erasable and Programmable ROM) 14 which stores various programs and various data including an operating system to be executed by the CPU 11; a display (display unit) 15, a touch panel 16 configured to detect a touch operation to the display screen; a GPS (Global Positioning Systems) receiving unit 17 configured to receive GPS signals including location information (latitude, longitude and altitude) of the smartphone 10 by a GPS satellite or an IMES (Indoor Messaging System) as an Indoor GPS; a camera unit 18 configured to electronically take images of a subject; a microphone unit 19 configured to input audio through a microphone; a speaker unit 20 configured to output audio through a speaker; a communication unit 21 configured to communicate wirelessly with the nearest base station or the like using an antenna 21A; a short-range wireless communication unit 22 configured to communicate with external devices using the antenna 22A over short-distance wireless communication; a sensor unit 23 including various sensors such as a magnetometer, a gyrocompass and an acceleration sensor; a media drive 24 configured to read and write data from and to a memory card 25; and the like. The respective units are connected by buses 26.

The camera unit (image-capturing unit) 18 captures an optical image of the subject imaged by an imaging lens, with an area image sensor (two-dimensional image sensor). The imaging lens is provided with a focus adjustment function and a light intensity adjustment function. The area image sensor includes, for example, a color solid-state imaging element such as CCD (Charged Coupled Device), a CMOS (Complementary Metal Oxide Semiconductor) having a predetermined color filter array (for example, Bayer array). The camera unit 18 captures moving images and still images of subjects under the control of the CPU 11.

The smartphone 10 functions as a reading device by the CPU 11 executing a predetermined program (reading program).

Figure 6:
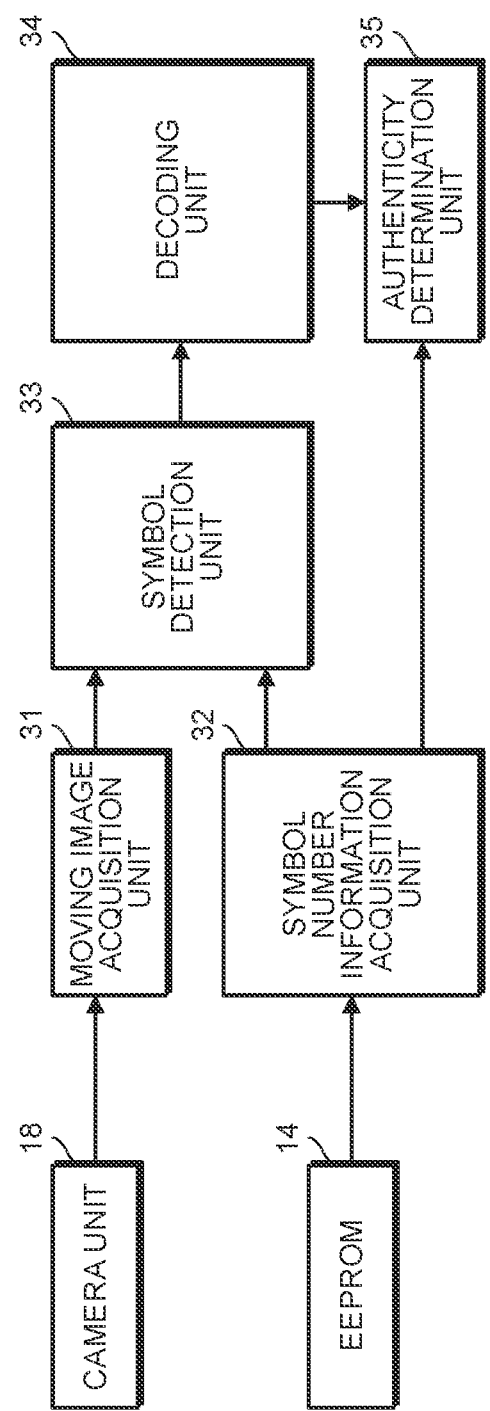
FIG. 6 is a functional block diagram illustrating a smartphone as a reading device.

FIG. 6 is a functional block diagram illustrating a smartphone as a reading device.

As illustrated FIG. 6, the smartphone 10 as the reading device has functions of: a moving image acquisition unit 31 configured to acquire a moving image of the composite symbol; a symbol number information acquisition unit 32 configured to acquire information on the number of symbols included in the composite symbol; a symbol detection unit 33 configured to detect the symbols from the acquired moving image; a decoding unit 34 configured to decode the symbols; and an authenticity determination unit 35 configured to determine authenticity of the read composite symbol.

The moving image acquisition unit 31 acquires a moving image from the camera unit 18. The moving image is captured while moving the smartphone 10 or changing the angle of the smartphone 10 relative to the composite symbol. In other words, the moving image is a moving image captured while continuously changing the viewing angle relative to the composite symbol. Here, note that the moving image in the description includes still images which are continuously captured, so-called continuous shots.

Figure 7:
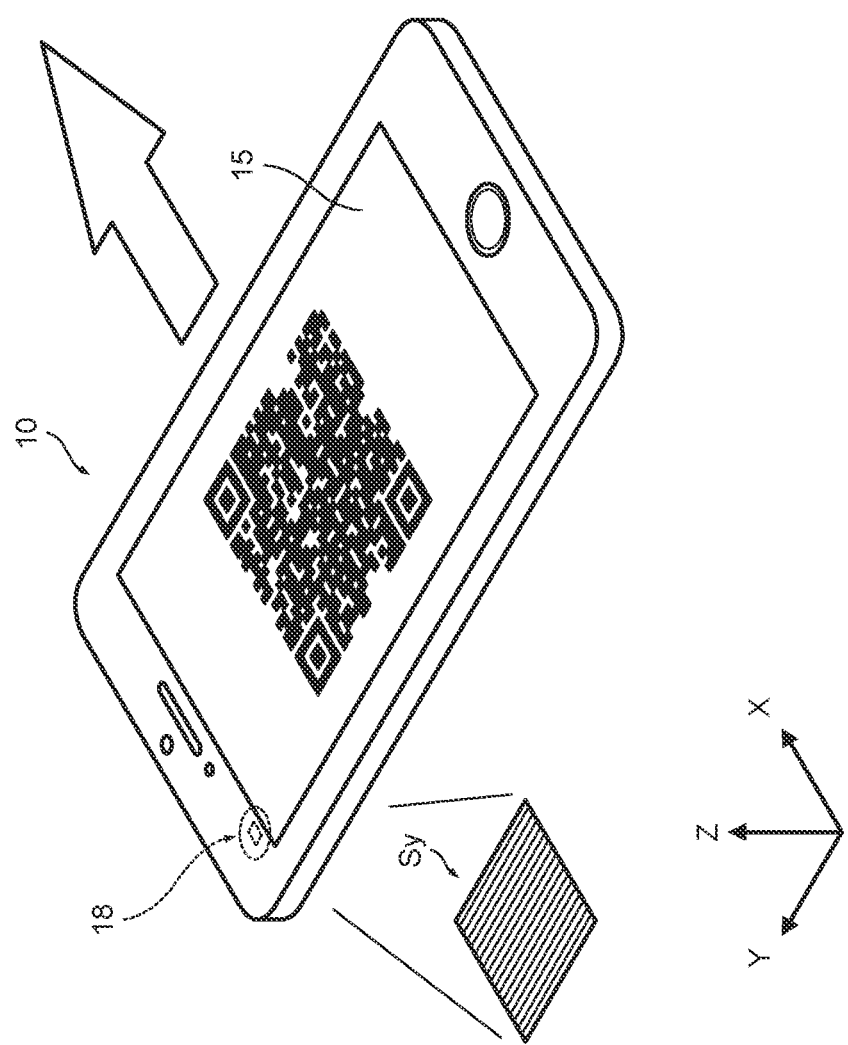
FIG. 7 is a conceptual diagram illustrating image-capturing of a moving image for reading the composite symbol.

FIG. 7 is a conceptual diagram illustrating image-capturing of the moving image for reading the composite symbol.

FIG. 7 shows a conceptual diagram illustrating a case where an images is captured while moving the smartphone. As illustrated in FIG. 7, an image of the composite symbol Sy is captured while moving the smartphone 10 along a predetermined reading direction (the direction indicated by an arrow in the drawing).

The reading direction means a direction in which the appearance of the composite symbol Sy is switched (a changing direction). This direction corresponds to the arrangement direction of lenses of the lenticular lens sheet that constitutes the composite symbol Sy. In an example illustrated in FIG. 7, the unit lenses are arrayed along the X direction in the lenticular lens sheet, and the appearance of the composite symbol Sy is changed when moving the viewpoint along that direction (X direction). In image-capturing, the smartphone 10 may be moved linearly along the surface of the composite symbol Sy or may be moved along a circular arc. When the smartphone 10 is moved along the circular arc, the amount of movement can be reduced.

In order for the composite symbol Sy to switch, the images of the composite symbol may be captured while moving the composite symbol Sy. Further, the images may be captured while the inclination of the composite symbol Sy is continuously changed with respect to the smartphone 10. Accordingly, the images of the composite symbol Sy may be continuously captured while changing the angle.

The symbol number information acquisition unit 32 acquires information on the number of symbols included in the composite symbol. The number of symbols included in a composite symbol is a so-called number of times of change and is the number of symbols to be switched. Therefore, when two symbols are to be switched, the number of symbols is "2". In this embodiment, the information on the number of symbols included in the composite symbol is stored in EEPROM 14. The symbol number information acquisition unit 32 acquires the information on the number of symbols included in the composite symbol from the EEPROM 14.

The symbol detection unit 33 detects the symbols from the moving image obtained by image-capturing. In other words, the images of the respective frames acquired in chronological order are analyzed, and symbols are detected from the moving image. The symbol detection unit 33 detects symbols that are in a decodable state, as symbols. Therefore, if the image is so blurred that the symbol cannot be decoded, or if the image is captured with so much missing (deficiency) that the symbol cannot be decoded, those symbols are not be detected as the symbols. The symbol detection unit 33 records the images of the detected symbols in RAM 13. Note that, after the decodable symbols are detected, even if the same symbols are detected, those images are not recorded. When all the symbols included in the composite symbol are detected, the symbol detection unit 33 terminates the detection process. In other words, in a case where the symbols of the same number as the number acquired by the symbol number information acquisition unit 32 are detected, the symbol detection process is terminated.

The decoding unit 34 decodes the symbols. The decoding unit 34 analyzes the images of the symbols stored in RAM 13 and decodes the symbols.

The authenticity determination unit 35 determines the authenticity of the read (captured) composite symbol Sy based on the moving image obtained by image-capturing. In this embodiment, in a case where all the symbols included in the composite symbol are detected and all the detected symbols are authentic (genuine), the composite symbol is determined to be authentic. Thus, for example, in a case where only two symbols are detected for a composite symbol containing three symbols, the composite symbol is determined to be fraudulent. For example, even in a case where all of these symbols are detected, if one fraudulent symbol is included in the symbols, the composite symbol is determined to be fraudulent. The authenticity of each detected individual symbol is determined, for example, based on the result of decoding. In other words, in a case where the result of decoding is legitimate information, the symbol is determined to be authentic. In a case where the result of decoding is non-legitimate information, the symbol is determined to be fraudulent.

The smartphone 10, as the reading device, performs the subsequent process in a case where the read composite symbol is authentic.

[Reading of Composite Symbols]

Next, a process of reading composite symbols using the reading device (smartphone) according to the embodiment will be described. Here, as a composite symbol, a case where two two-dimensional codes (QR codes) are made appeared in a switching manner depending on the viewing angle, as illustrated in FIG. 1, will be described.

Figure 8:
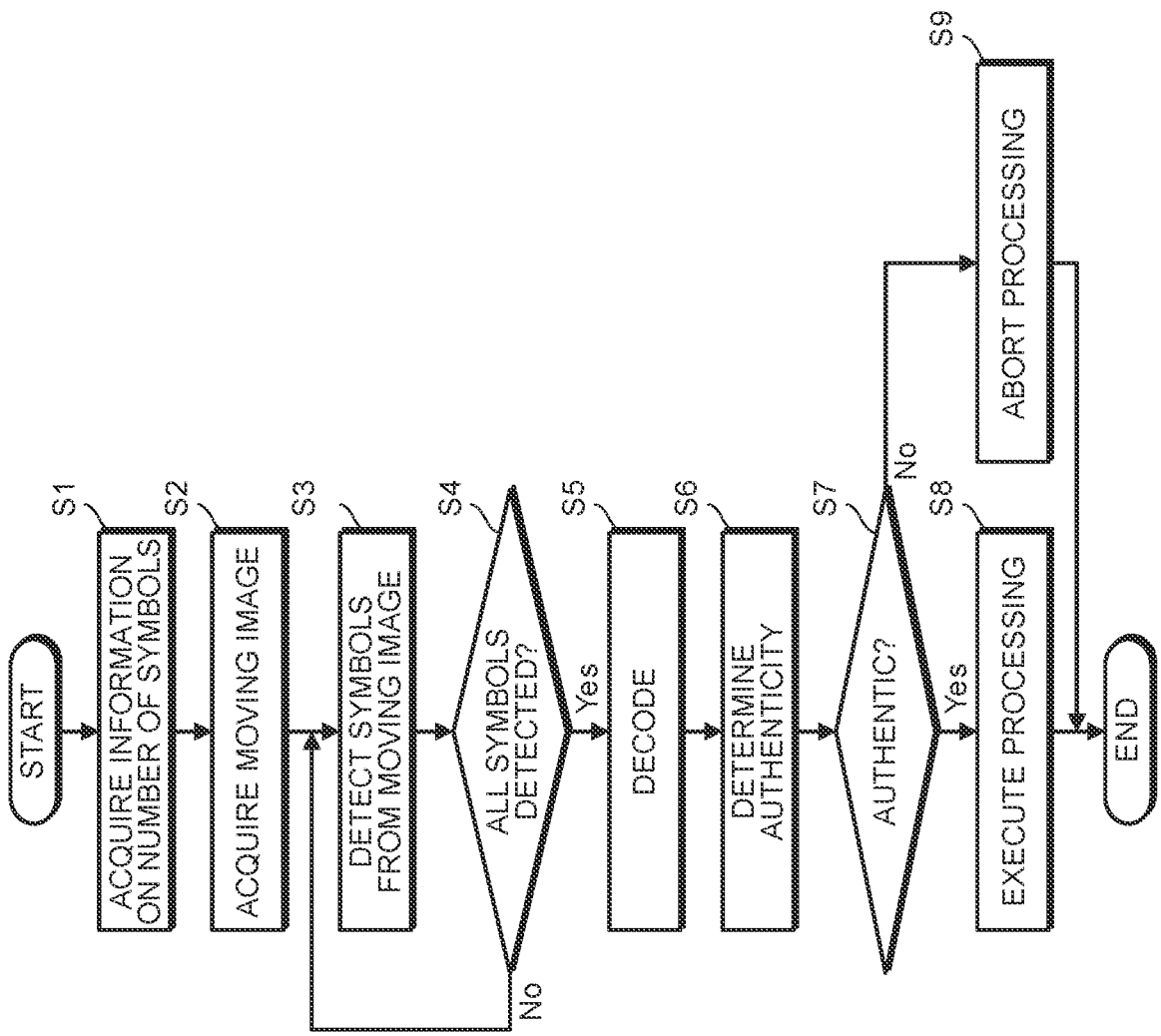
FIG. 8 is a flowchart illustrating a procedure a process of reading a composite symbol.

FIG. 8 is a flowchart illustrating a process of reading a composite symbol (reading method).

First, information on the number of symbols included in the composite symbol to be read is acquired (Step S1). Here, the number of symbols is "2". This information is read and acquired from EEPROM 14.

Next, a moving image of the composite symbol (including a series of still images) is acquired (step S2). As described above, the image of the composite symbol is captured by moving the smartphone 10 along the predetermined reading direction (see FIG. 7). Accordingly, changing of the composite symbol can be captured as a moving image.

Next, symbols (two-dimensional codes) are detected from the acquired moving image (Step S3). The detected symbols are recorded sequentially in the RAM 13.

Whether all the symbols have been detected is determined (Step S4). In a case where all the symbols are detected, the detection process terminates. Also, the image-capturing (acquisition of moving image) terminates.

Next, each of the detected symbols is decoded (Step S5). Then, the authenticity of the composite symbol is determined (Step S6) based on the decoding results. As described above, in a case where all the symbols included in the composite symbol are detected, and all the detected symbols are authentic, the composite symbol is determined to be authentic.

Based on the result of authenticity determination, it is determined whether or not the read composite symbol is authentic (Step S7). In a case where the read composite symbol is authentic, a subsequent process is performed based on the read information (decoded information) (Step S8). For example, access to a website, an authentication processing, or settlement processing are performed based on the read information. On the other hand, in a case where the composite symbol read is fraudulent, the subsequent process is aborted (Step S9).

In this manner, in the embodiment, a moving image of the composite symbol is captured, symbols are detected from the obtained moving image, and the authenticity determination is performed. This makes it possible to read composite symbols easily and quickly.

Modified Examples

[Modified Example of Method of Acquiring Information on Number of Symbols]

The above-described embodiment is configured to set the information on the number of symbols included in the composite symbol to be read in advance, on the reading device side (smartphone side). The method of acquiring information on the number of symbols included in the composite symbol is not limited thereto.

A configuration is also applicable in which information on the number of symbols N included in the composite symbol is recorded in the composite symbol in advance so that the information is read to acquire the number of symbols included in the composite symbol. Specifically, information on the total number of symbols (information on the number of symbols included in the composite symbol) is recorded in each of the symbols, and the information is read from the symbols to acquire the information on the number of symbols. Furthermore, information on the number of symbols before the symbol in question (or how manieth the symbol in question is) may be recorded in each of the symbols. For example, a QR code, a kind of two-dimensional codes, has a concatenation function so that a single symbol can be segmented and represented in a plurality of fragments. In this case, each of the segmented symbols stores an indicator indicating the number of segments and the number of symbols before the symbol (or how manieth the symbol is). Therefore, by reading the indicator, the information on the number of symbols can be acquired from each of the symbols.

In addition, the reading device may be configured such that the information on the number of symbols is input manually to the reading device by a user. Alternatively, the reading device may be configured such that the information is automatically acquired from the outside through a network or other means.

[Modified Example of Method of Detecting Symbol]

In the present invention, the symbols are detected from a moving image (including a series of still images shot continuously), and in this case, it is preferable to facilitate recognition of symbol switching. A technique for improving the detection accuracy of the symbols will be described below.

(1) Changing a Color of Each of the Symbols

Figure 9:
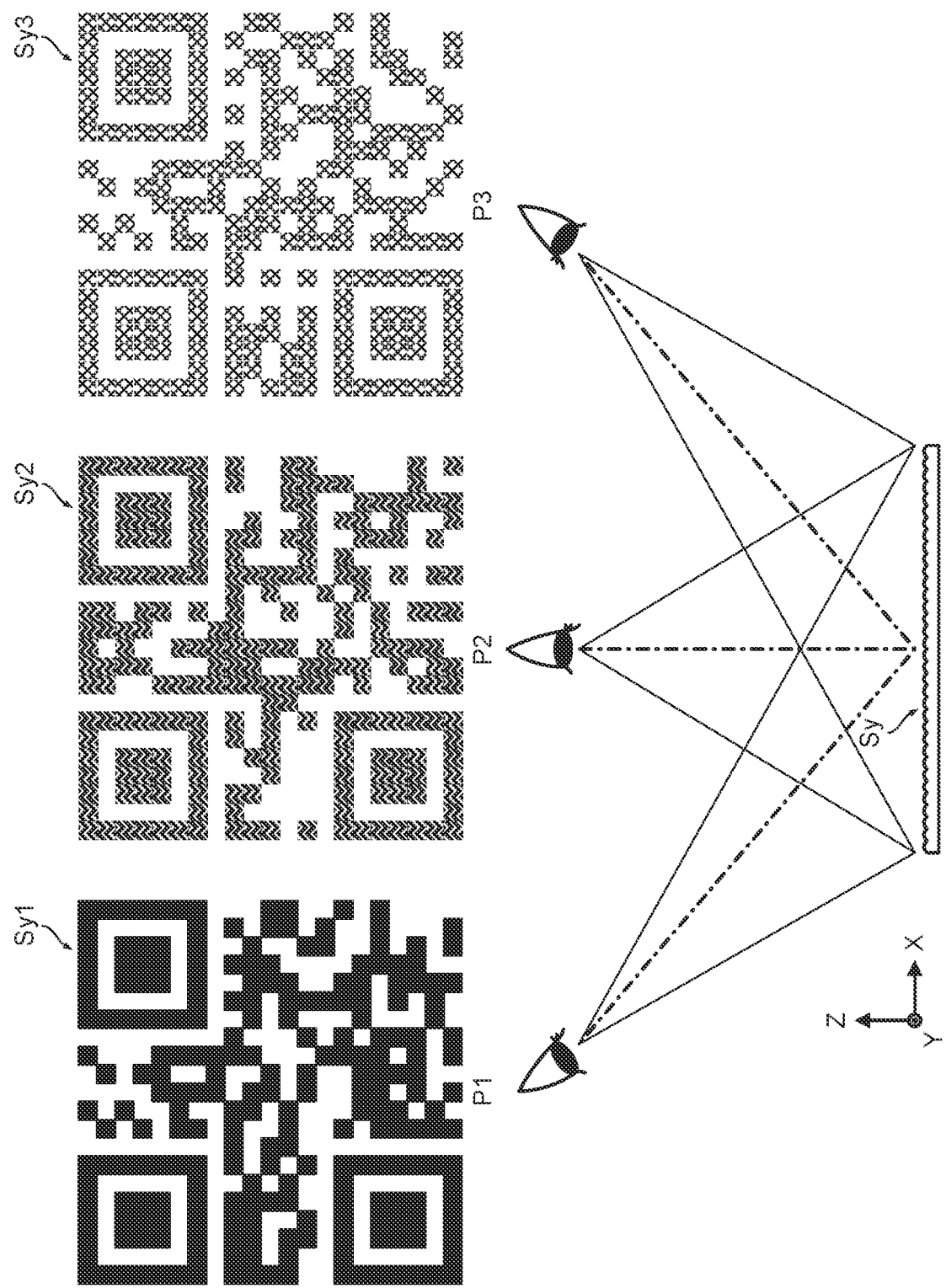
FIG. 9 is a drawing illustrating an example of a technique for facilitating recognition of symbol switching.

FIG. 9 is a drawing illustrating an example of a technique for facilitating recognition of symbol switching.

FIG. 9 illustrates an example of a case where three symbols (the first symbol Sy1, the second symbol Sy2, and the third symbol Sy3) are made appeared in a switching manner using a lenticular lens sheet.

Each of the three symbols is printed in a different color. For example, the first symbol Sy1 is printed in black, the second symbol Sy2 is printed in magenta, and the third symbol Sy3 is printed in cyan. The symbol detection unit 33 detects symbol switching based on the color switching and detects each of the symbols. Accordingly, it is possible to detect each of the symbols included in the composite symbol Sy with greater accuracy. Note that the color of each of the symbols should be, at least, different from the adjacent symbols.

(2) Usage of Chart

Figure 10:
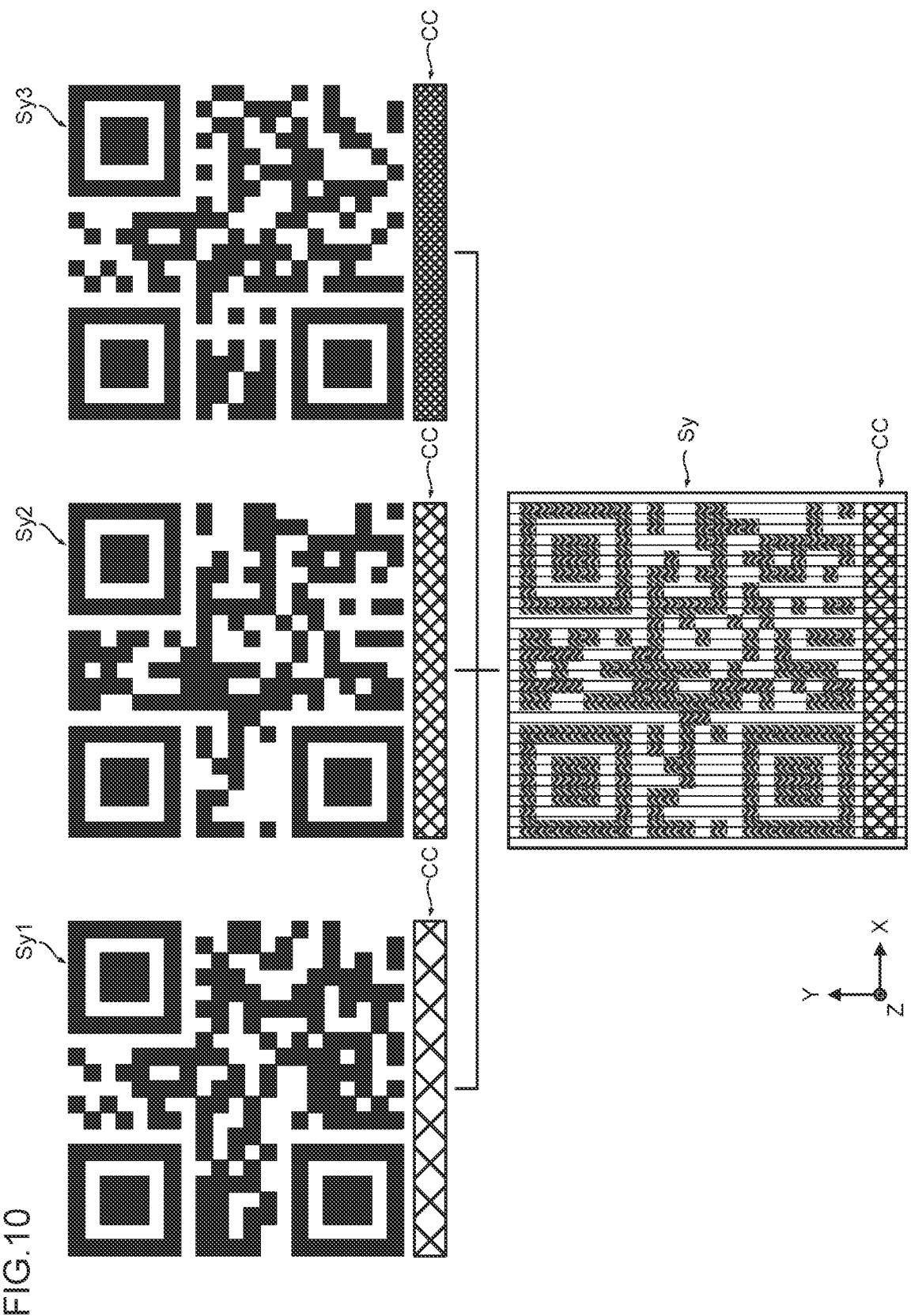
FIG. 10 is a drawing illustrating an example of a technique for facilitating the recognition of the symbol switching.

FIG. 10 is a drawing illustrating an example of a technique for facilitating recognition of symbol switching.

FIG. 10 illustrates an example of a case where three symbols (the first symbol Sy1, the second symbol Sy2, and the third symbol Sy3) are made appeared in a switching manner using a lenticular lens sheet.

As illustrated in FIG. 10, a chart CC including band-shaped images parallel to the composite symbol Sy is displayed. The chart CC is placed along the reading direction of the composite symbol Sy (X direction in FIG. 10). The chart CC changes color in conjunction with the symbol switching. For example, the symbol appears in red at the position where the first symbol Sy1 is visible, orange at the position where the second symbol Sy2 is visible, and yellow at the position where the third symbol Sy3 is visible. Therefore, by detecting the color switching in the chart CC, the symbol switching can be detected. Accordingly, it is possible to detect each of the symbols included in the composite symbol Sy with greater accuracy.

In this example, description has been given on an example in which the color in the chart is switched, but the configuration of the chart is not limited thereto. In addition, a mode in which color density changes in conjunction with the symbol switching, a mode in which a design changes, etc. can be employed.

[Modified Example of Method of Determining Authenticity of Composite Symbol]

The embodiment described above is configured such that the composite symbol in question is determined to be authentic in a case where all the symbols included in the composite symbol are detected and all the detected symbols are authentic. The method of determining the authenticity of the composite symbol is not limited thereto. Other examples of methods of determining the authenticity of the composite symbol will be described below.

(1) Authenticity Determination Using the Order of Detection

In a case where a composite symbol is configured such that images appearing on the composite symbol are switched depending on a viewing angle, when the composite symbol is captured by moving the reading device in one direction, the images to be captured are switched in a certain order.

Figure 11:
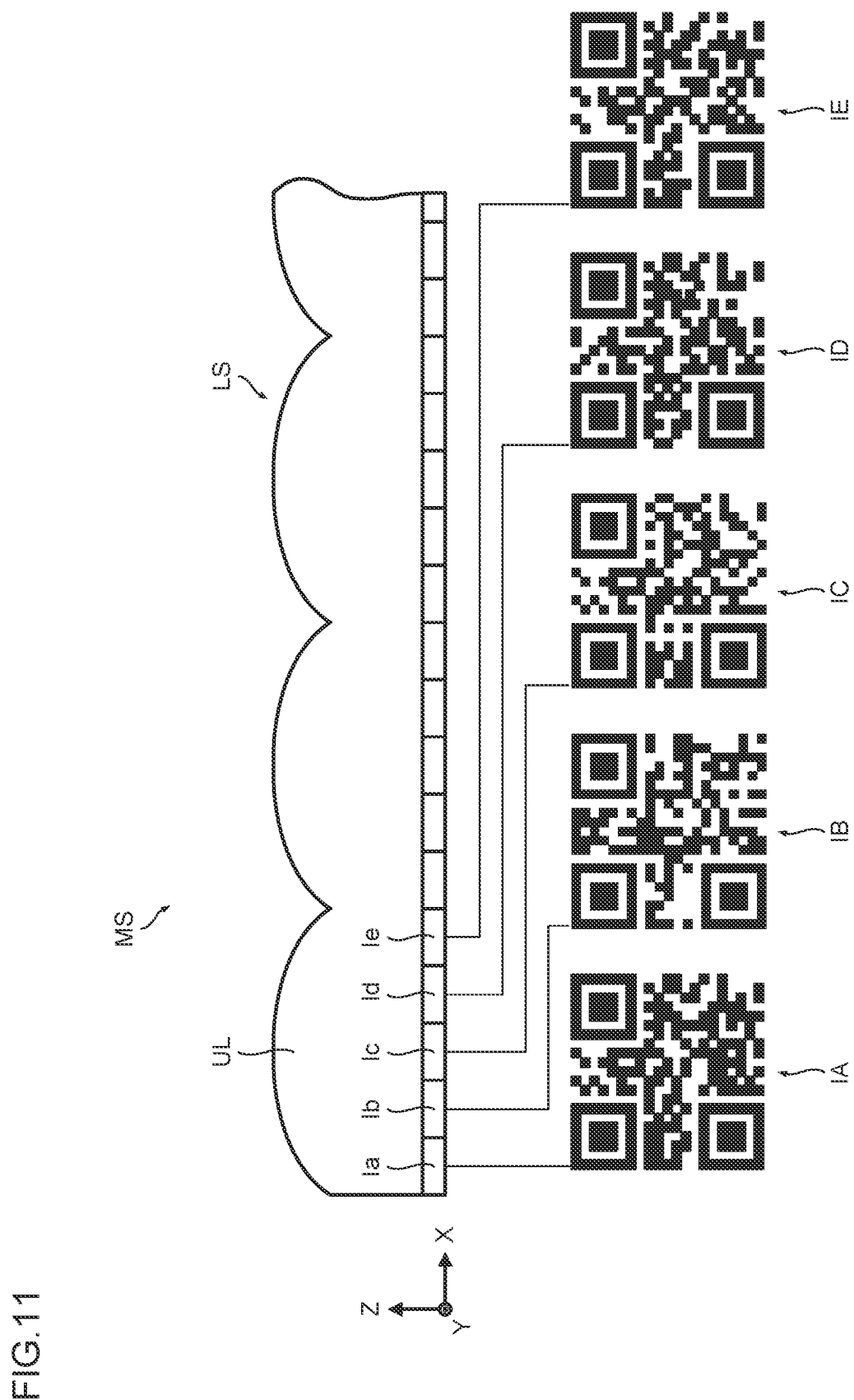
FIG. 11 is a drawing illustrating a schematic configuration of a composite symbol in a case where five symbols are switched.

FIG. 11 is a drawing illustrating a schematic configuration of a composite symbol in a case where five symbols are switched.

FIG. 11 illustrates an example of a case where the appearance of each of the symbols is switched by the lenticular lens sheet LS. On the lenticular lens sheet LS, band-shaped strips Ia to Ie which are cut out from images respectively constitute symbols, are printed in a predetermined order along the array direction of the lens (X-direction in FIG. 11). Specifically, the strip Ia cut out from the first image IA which constitutes the first symbol, the strip Ib cut out from the second image IB which constitutes the second symbol, the strip Ic cut out from the third image IC which constitutes the third symbol, the strip Id cut out from the fourth image ID which constitutes the fourth symbol, and the strip Ie cut out from the fifth image IE which constitutes the fifth symbol are arranged in this order and printed.

Figure 12:
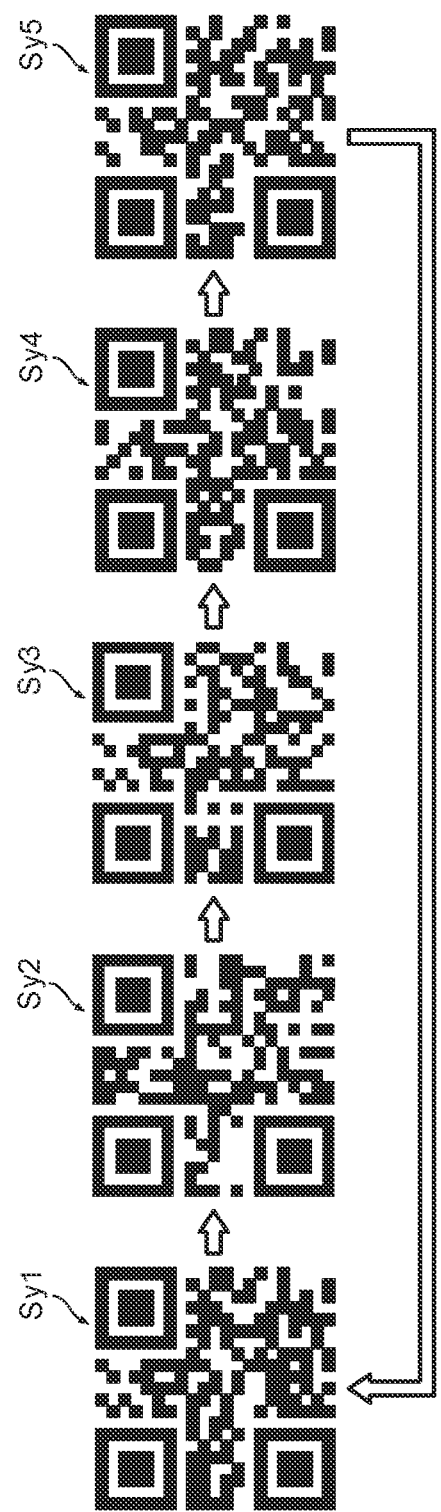
FIG. 12 is a conceptual diagram illustrating symbol detection.

FIG. 12 is a conceptual diagram illustrating the detection of symbols.

In a case where the composite symbol Sy having the configuration illustrated in FIG. 11 is read along the predetermined reading direction (X direction in the drawing), each of the symbols is detected in the order of "first symbol Sy1, then second symbol Sy2, then third symbol Sy3, then fourth symbol Sy4, and then fifth symbol Sy5".

Therefore, the authenticity of the composite symbol Sy can be determined by using the information on the order of detection. In other words, the order of the symbols detected from the moving image is detected in chronological order, and it is determined whether or not the symbols are detected in the normal (regular) order so as to determine the authenticity. In this case, in a case where the symbols are not detected in the normal order, the composite symbol is determined to be fraudulent.

Note that the determination technique can be used in combination with other determination techniques. For example, the determination technique may be configured to determine the composite symbol to be authentic when all the symbols included in the composite symbol are detected in the normal order, and all of the detected symbols are authentic.

Note that, in a case where a composite symbol is configured using the lenticular lens sheet, when the composite symbol is observed while moving the reading device and the composite symbol relative to each other in one direction, the appearance of symbols is repeatedly switched in a fixed pattern (manner). For example, in the case of the above described composite symbol including five symbols, the appearance is repeatedly switched in a pattern of "the first symbol Sy1, then the second symbol Sy2, then the third symbol Sy3, then the fourth symbol Sy4, and then the fifth symbol Sy5". In this case, depending on the position at which the reading starts, there may be a case where the symbols is detected in the order of "the second symbol Sy2, then the third symbol Sy3, then the fourth symbol Sy4, then the fifth symbol Sy5, and then the first symbol Sy1" or "the third symbol Sy3, then the fourth symbol Sy4, then the fifth symbol Sy5, then the first symbol Sy1, and then the second symbol Sy2". Therefore, in such a case, the order is determined by considering repetition. For example, the symbol detected first may be used as a reference to determine whether the order is normal or not. For example, in a case where the third symbol Sy3 is detected first, if the symbols are detected in the order of "the third symbol Sy3, then the fourth symbol Sy4, then the fifth symbol Sy5, then the first symbol Sy1, and then the second symbol Sy2", it is determined that the symbols are detected in the normal order. Alternatively, whether the order is normal or not is determined based on comparison with a repeating pattern.

(2) Authenticity Determination Using Transition of Switching

In a case where a composite symbol is configured such that the appearance is switched depending on a viewing angle, if the composite symbol is continuously observed while changing the viewing position, an image with mixed signals emerges in the middle position of the switching.

Figure 13:
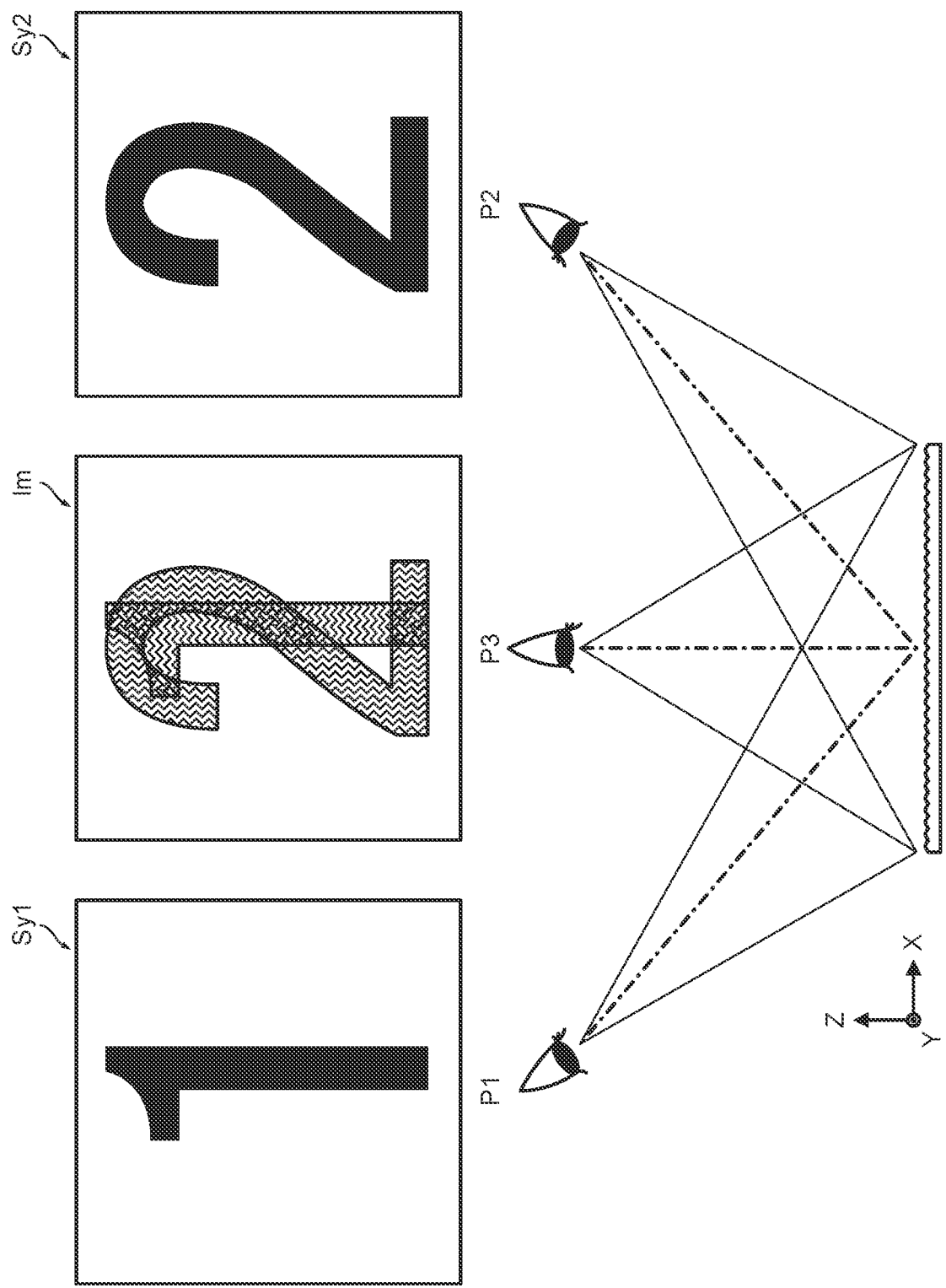
FIG. 13 is a conceptual diagram illustrating interference in a composite symbol.

FIG. 13 is a conceptual diagram illustrating interference in a composite symbol.

The composite symbol Sy illustrated in FIG. 13 is a composite symbol which is configured such that the appearance is switched between two symbols using a lenticular lens sheet. As illustrated FIG. 13, in the composite symbol Sy, the first symbol Sy1 (here, a numerical character of "1") is visible at the first viewpoint P1, and the second symbol Sy2 (here, a numerical character of "2") is visible at the second viewpoint P2. In contrast, at a third viewpoint P3 between the first viewpoint P1 and the second viewpoint P2, an image Im in which the first symbol Sy1 and the second symbol Sy2 are interfering with each other is visible. The mixture ratio (ratio of mixture) varies with the position of viewpoint, and an amount of mixture of the first symbol Sy1 increases as the position gets closer to the first viewpoint P1. Likewise, the amount of mixture of the second symbol Sy2 increases as the position gets closer to the second viewpoint P2.

In this manner, in a case where the composite symbol configured such that the appearance is switched depending on the viewing angle, the appearance changes in stages (gradually) during the switching of the appearance. Therefore, it is possible to use the transition of the switching of appearance in order to achieve the authenticity determination.

For example, the authenticity determination can be performed based on whether or not mixed images are detected before and after the switching. For example, in the example illustrated in FIG. 13, authenticity is determined based on whether or not the image (mixed image) Im in which the first symbol Sy1 and the second symbol Sy2 are mixed, is detected. In a case where the mixed image is detected, the composite symbol is determined to be authentic. In a case where the mixed image is not detected, the composite symbol is determined to be fraudulent.

For more stringent determination, chronological change in the switching may be added to the determination criteria. In other words, authenticity may be determined by comparing the modes of change in the mixture ratio that changes in chronological order. For example, a configuration can be adapted so that a composite symbol is determined to be authentic in a case where the mixture ratio of two symbols changes in a predetermined transition.

The determination technique in this example can also be used in combination with other determination techniques. For example, the determination technique may be configured so that the composite symbol is determined to be authentic in a case where all the symbols included in the composite symbol are detected in the normal order, and all of the detected symbols are authentic, and the symbols have changed in the predetermined manner.

The transition of switching can be used for authenticity determination, as in this example so as to properly prevent fraudulent readings, for example, such as a case where symbols included in a composite symbol are image-captured and arranged side by side.

(3) Authenticity Determination by Changing Emergence Ratio of Symbols

For example, in the case of composite symbols in which the appearance is switched with a lenticular lens sheet, the emergence ratio of each of the symbols can be adjusted. For example, in a composite symbol having a configuration in which two symbols are switched, one symbol can be set to appear for a longer period of time than the other when the composite symbol is viewed while continuously changing an angle.

Figure 14:
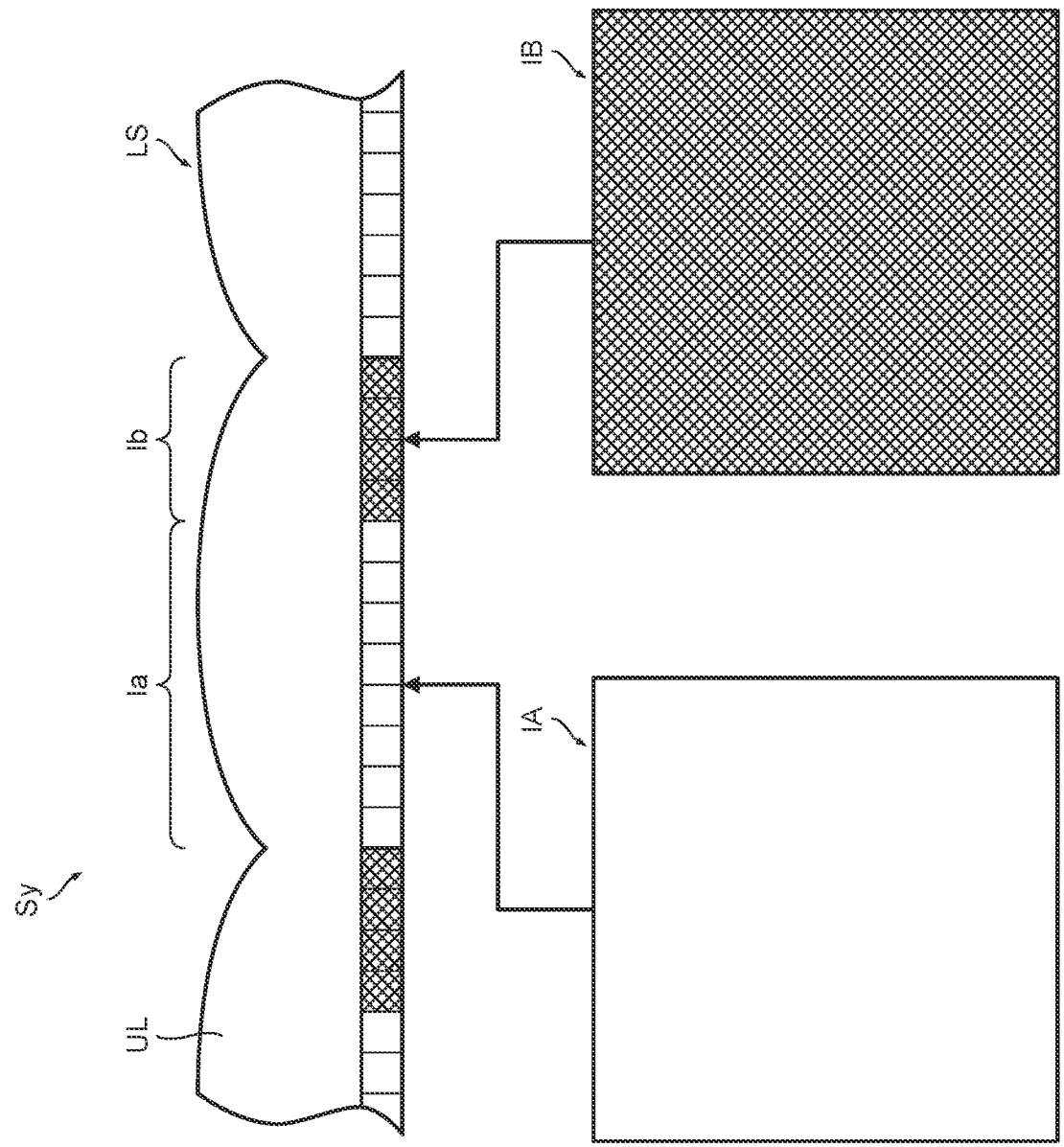
FIG. 14 is a cross-sectional view illustrating a schematic configuration of a composite symbol in a case where an emergence ratio of symbols is changed.

FIG. 14 is a cross-sectional view illustrating a schematic configuration of a composite symbol in a case where an emergence ratio of the symbols is changed.

FIG. 14 illustrates an example of a case where two symbols (the first symbol and the second symbol) are switched to appear using the lenticular lens sheet LS.

As illustrated in FIG. 14, in a case where the two symbols are switched to appear by the lenticular lens sheet LS, the area ratio of each of the image strips Ia and Ib to be placed in one unit lens UL is changed in order to change the emergence ratio of each of the symbols. For example, assuming that the emergence ratio of the first symbol to the second symbol is set to 2:1, the area ratio of a strips Ia cut out from the image (first image) IA constituting the first symbol to the strips Ib cut out from the image (second image) IB constituting the second symbol is set to 2:1. Accordingly, when the reading device is moved at a constant speed, images of the first symbol and second symbol are captured substantially at an emergence ration of 2:1.

In this manner, when reading the composite symbol having a different emergence ratio of the symbols, information on the emergence ratio may be used to perform authenticity determination. In other words, in a case where the image of each of the symbols is captured at an emergence ratio of the symbols which is the same (including almost the same) as the emergence ratio set to the corresponding composite symbol, the composite symbol is determined to be authentic. Alternatively, in a case where each of the symbols is detected from the captured moving image at the same ratio, the composite symbol is determined to be authentic.

The determination technique in this example can also be used in combination with other determination techniques. For example, the determination technique may be configured so that the composite symbol is determined to be authentic in a case where all the symbols included in the composite symbol are detected in the normal order, and all of the detected symbols are authentic, and the image of each of the symbols has captured at the emergence ratio set in advance.

(4) Other Methods for Authenticity Determination

In a case where the symbol color also changes depending on the viewing angle, the information on the change in color of each of the symbols can be used for authenticity determination.

[Modified Example of Decoding Technique]

When decoding the composite symbol, it is preferable that image correction is performed as needed. For example, it is possible to perform processing for correcting distortions in the image caused by image-capturing at an angle and so on.

[Modified Example of Hardware Configuration of Reading Device]

In the above-described embodiment, an example of a case where the smartphone functions as a reading device has been described, but the configuration of the reading device is not limited thereto. The reading device may be also configured as a device dedicated to reading. A portable device with a camera function in the same manner as smartphones (e.g., mobile phones, tablet computers, personal digital assistants (PDA), laptops, etc.) can also function as a reading device.

Hardware for achieving the present invention can include various processors (processor). The various processors include a CPU (Central Processing Unit) which is a general-purpose processor executing programs and functioning as various processing units, a programmable Logic Device (PLD) such as a FPGA (Field Programmable Gate Array) or the like which is a processor whose circuit configuration can be changed after its manufacture, and a specific electrical circuit such as ASIC (Application Specific Integrated Circuit) which is a processor having a specifically designed circuit configuration for executing specific processing. One of processing units that constitute an inspection support device may be configured by one of the above-described various processors, or may be configured with two or more processors of the same type or different types. For example, a single processing unit may be configured with a plurality of FPGAs or a combination of CPU and FPGA. Alternatively, a plurality of the processing units may be configured with a single processor. As an example in which the plurality of processing units are configured with a single processor, firstly, as represented by a computer such as a client or a server, there is a mode in which one processor is configured with a combination of one or more CPUs and software, and the processor functions as a plurality of processing units. Secondly, as represented by a System on a Chip (SoC), there is a mode in which a processor implements functions of the entire system including a plurality of processing units, with a single IC (Integrated Circuit) chip. In this manner, the various processing units are configured with one or more of the various processors as a hardware structure. Furthermore, the hardware structure of these various processors is, more specifically, an electrical circuit (circuitry) in which circuit elements such as semiconductor elements are combined.

[Support Function for Image-Capturing]

When the reading device is provided with a display unit (including a case where a device provided with a display such as a smartphone functions as a reading device), it is preferable that a moving image being captured is displayed on the display unit (so-called, live-view video is displayed). Accordingly, the moving image can be captured while a user is checking the changing of the composite symbol on the display unit.

Furthermore, in a case where the moving image being captured is displayed on the display unit, it is preferable that a frame (image-capturing frame) enclosing the composite symbol is superimposed (overlaid) on the moving image being captured, during image-capturing.

Figure 15:
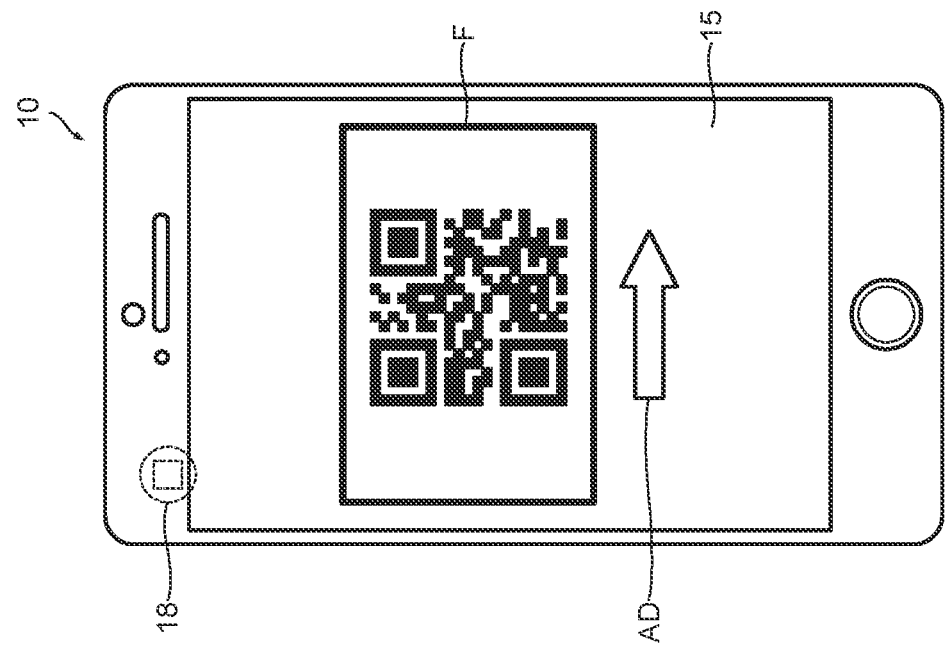
FIG. 15 is a drawing illustrating an example of a display of a frame for image-capturing.

FIG. 15 is a drawing illustrating an example of a display of an image-capturing frame.

FIG. 15 illustrates a case where the smartphone 10 functions as the reading device. As illustrated in FIG. 15, the moving image captured by a camera unit 18 is displayed on a display (display unit) 15 in real-time. The image-capturing frame F is displayed on the image in an overlapped manner. The user takes an image of the composite symbol to be read by adjusting the position of the smartphone 10 so that the composite symbol fits into the image-capturing frame F. This makes it easy to take an image of the composite symbol.

The image-capturing frame F is set taking into account a minimum object distance (M.O.D.) that the camera unit 18 has. In other words, as long as an image (a subject) is fitted into the image-capturing frame F and image-captured, a size of the image is always set so as to make the camera unit 10 focused on the subject.

In a case where information on the reading direction (the direction in which the reading device is to be moved) can be acquired, it is preferable that such information is also displayed on the display unit. In the example illustrated in FIG. 15, an arrow AD indicating the reading direction is displayed on the display (display unit) 15.

[Modified Example of Composite Symbols]

(1) Contents of Symbol to be Switched

As described above, symbols constituting the composite symbol include codes (such as bar codes and two-dimensional codes), signs, characters (including pictograms), figures and designs (including patterns), etc. The composite symbol does not necessarily have to be configured with the same type of symbols but may be configured with different types of symbols combined. For example, the composite symbol may be configured with two-dimensional code and a bar code combined or may be configured with a two-dimensional code and characters, etc. combined.

In addition to QR codes, two-dimensional codes of various standards, such as PDF417, Veri Code, Maxi Code, Data Matrix, etc. can be used. The configuration may be a matrix type (matrix code) or a stack type (stack code).

The number of symbols to be switched is not particularly limited and can be set arbitrarily in a feasible extent. As an example, a configuration in which two to five symbols are switched may also be applicable.

(2) Means for Switching Appearance

In the embodiment described above, the lenticular lens sheet is used as means of switching the appearance, but the means of switching the appearance is not limited thereto. In addition, for example, the same function can be achieved by a microlens array sheet.

Figure 16:
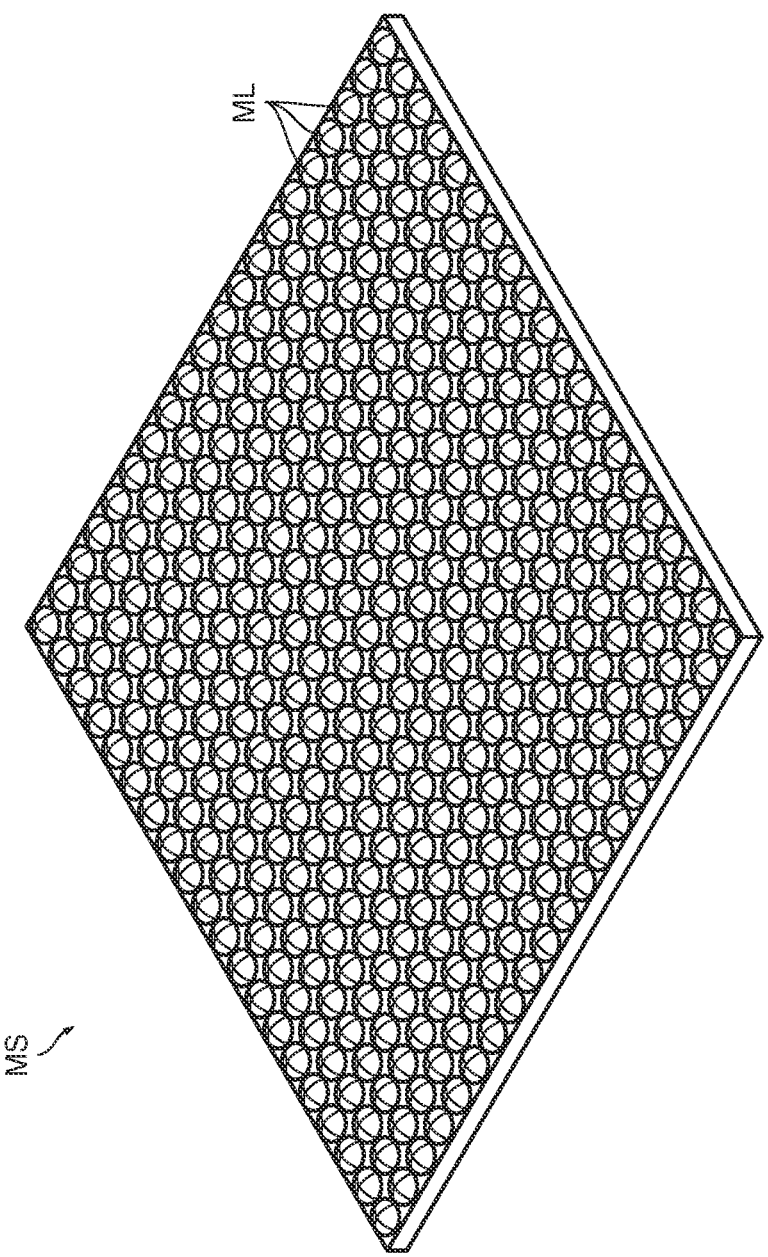
FIG. 16 is a perspective view illustrating a schematic configuration of a microlens array sheet.

FIG. 16 is a perspective view illustrating a schematic configuration of a microlens array sheet.

The microlens array sheet MS has a structure in which minute lenses (microlenses) MLs are arrayed in a matrix. The microlens array sheet MS, as well as the lenticular lens sheet, has a function to switch the appearance according to the viewing angle (changing function).

Figure 17:
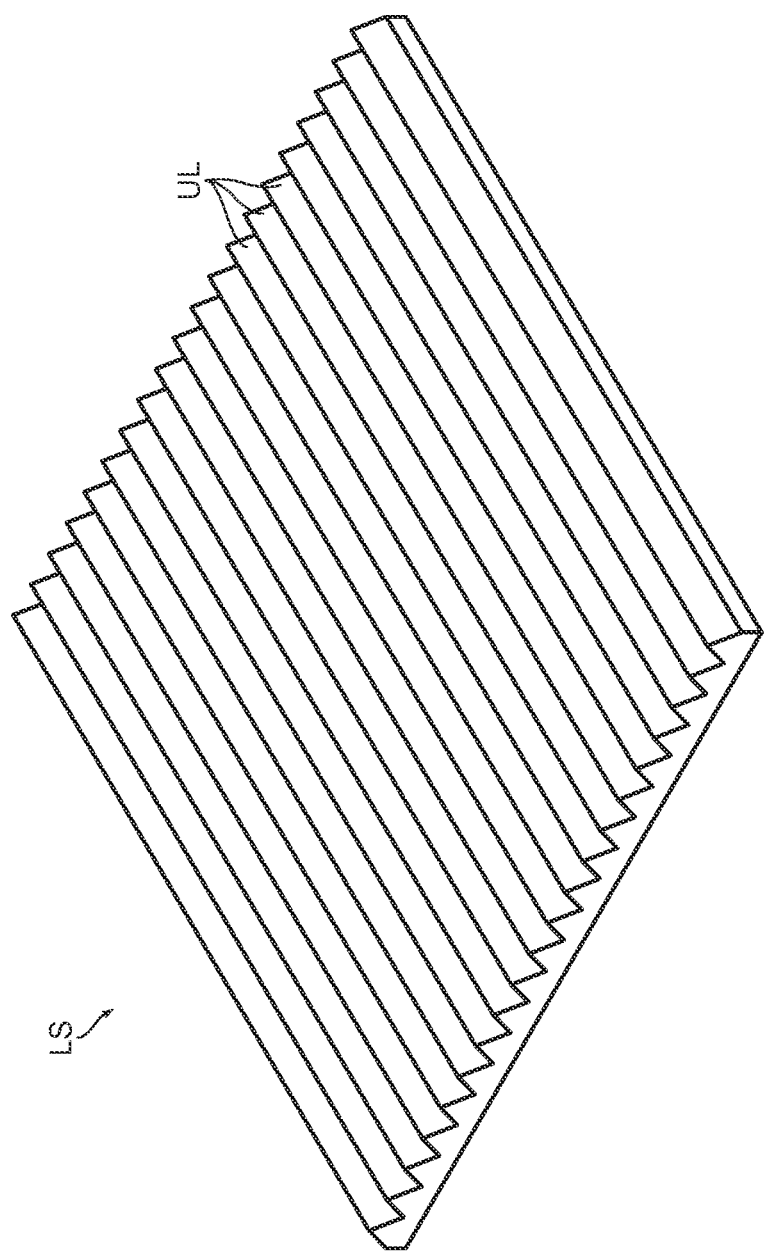
FIG. 17 is a perspective view illustrating another example of the lenticular lens sheet.

FIG. 17 is a perspective view illustrating another example of the lenticular lens sheet.

The lenticular lens sheet LS illustrated in FIG. 17 has unit lens UL respectively have prism shape. In other words, the lenticular lens sheet LS of this configuration has a structure in which many prism-shaped unit lenses UL are arrayed along one direction. The effect of changing is also achieved by the lenticular lens sheet LS in this configuration, and the appearance can be switched depending on the viewing angle.

The lenticular lens sheet and the microlens array sheet have an uneven surface (surface with convexoconcave) due to the structure thereof. There is a concern that these uneven surfaces can become crushed from use or clogged with dust, resulting in reading disabled. These defects can be eliminated by smoothing the surface of the lenticular lens sheet and the microlens array sheet.

Figure 18:
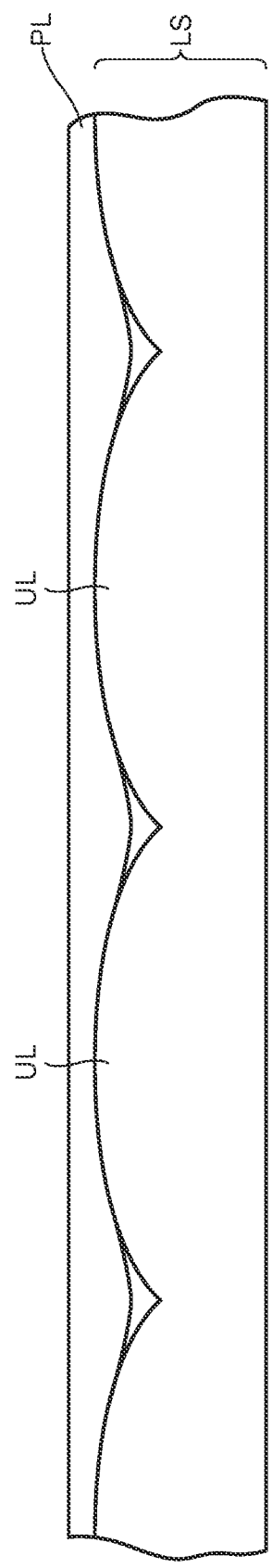
FIG. 18 is a drawing illustrating a schematic configuration of a lenticular lens sheet whose surface has been smoothed.

FIG. 18 is a drawing illustrating a schematic configuration of a lenticular lens sheet whose surface has been smoothed.

In the example illustrated in FIG. 18, the surface of the lenticular lens sheet LS is coated with a flat protective layer PL to smooth the surface while maintaining the lens effect. This makes it possible to switch appearances stably, even after long periods of use.

(3) Technology to Facilitate Detection of Symbols

As described above, the color of each of the symbols is changed or a chart is used in the composite symbols, so that the symbol switching becomes clearer and each of the symbols can be detected easier. In addition, it is also useful to provide certain clearances (gaps) between the image strips of each of the symbols placed within a single unit lens. This can reduce interference (symbol mixture) and make the switching between the symbols clearer.

Figure 19:
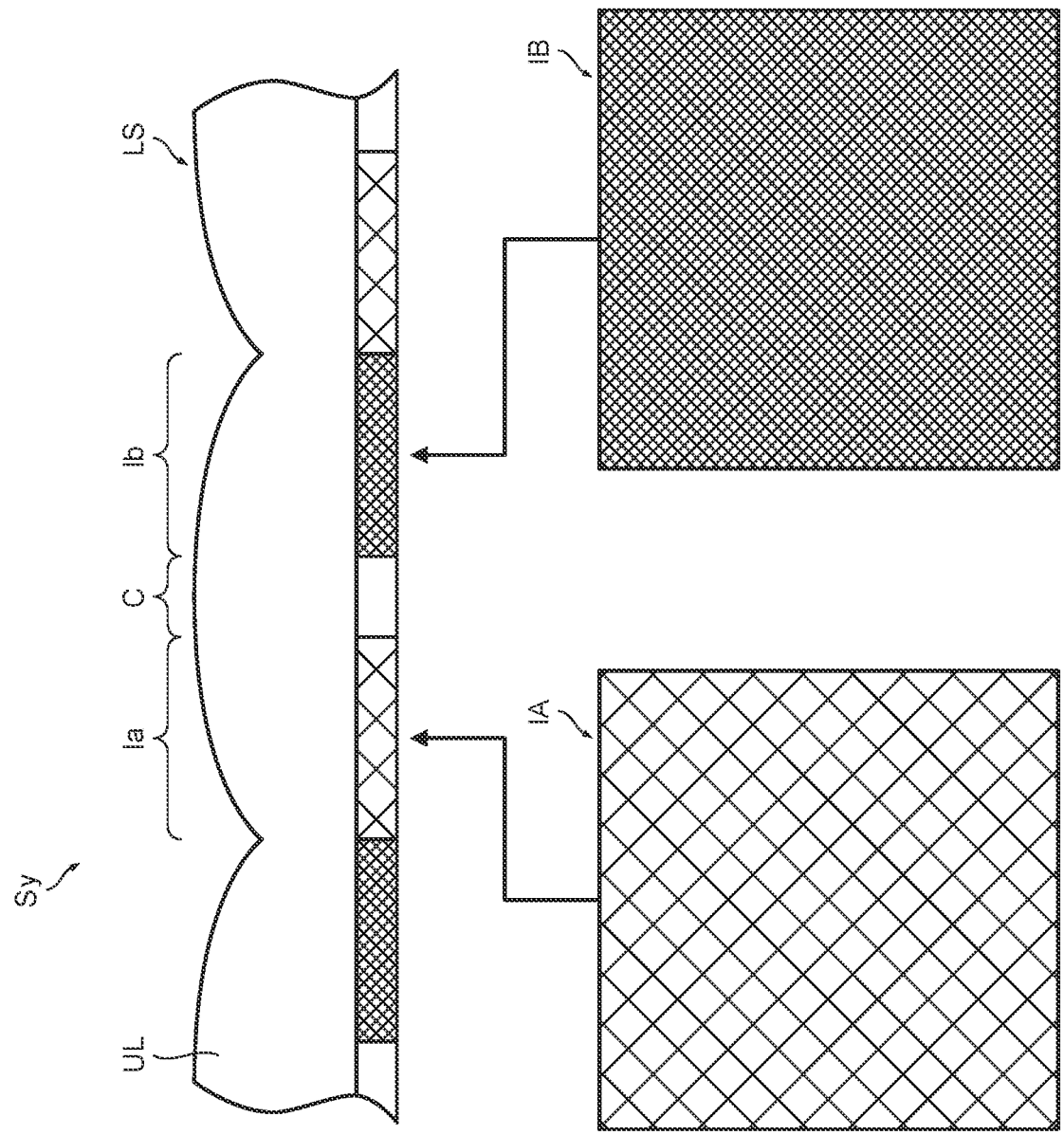
FIG. 19 is a conceptual diagram illustrating a configuration that clarifies symbol switching with clearances (gaps).

FIG. 19 is a conceptual diagram illustrating a configuration that clarifies symbol switching with clearances.

FIG. 19 illustrates an example of a case where two symbols (the first symbol and the second symbol) are caused to appear. In a case where two symbols are caused to appear, a band-shaped strip Ia cut out from the image representing the first symbol (first image) IA and a band-shaped strip Ib cut from the image representing the second symbol (second image) IB are placed in one unit lens UL. In placing the strips, a certain clearance (band-shaped clearance) C is placed between the strip Ia and strip Ib of each images. The placement of these clearances C can reduce the interference (afterimage of the switching) and make the switching clearer.

(4) Technology to Improve Security

In composite symbols, the images respectively constituting the symbols can be printed with special inks so as to further improve security. For example, composite symbols are printed with fluorescent ink, special color ink (inks that have been pre-mixed (toned) to express colors that cannot be reproduced by process colors in printing), etc. so that security can be further improved. However, in this case, the reading device must also be able to read the symbols printed with such an ink.

In a case where a lenticular lens sheet or microlens array sheet is used for switching the appearance, it is also useful to use a lenticular lens sheet or microlens array sheet with high lens resolution. The use of lenticular lens sheets or microlens array sheets with high lens resolution can increase the manufacturing difficulty and provide greater security. For example, in a case where the resolution of the lens reaches 200 LPI or higher, it becomes difficult to manufacture the lenticular lens sheet itself and print symbols thereon so as to effectively prevent counterfeiting. Furthermore, reducing the size of the symbols can make them more difficult to counterfeit.

(5) Technology to Improve Robustness

Even in a case where some symbols cannot be read, robustness can be improved by configuring the symbols such that the original data can be recovered from the remaining symbols. For example, in a composite symbol with a configuration in which N symbols (N number of symbols) are switched, even when some of the symbols are failed to be read, the original data can be recovered from the remaining M symbols (M number of symbols) (N and M are integers satisfying N>M). For example, in such a configuration, original data is divided into N data with redundancy and the composite symbols is generated using each of the divided data so that the original data can be recovered from arbitrary M data of the divided data. Other known error correction techniques can be used to generate the composite symbol whose original data can be recovered even in a case where some symbols are not readable. For example, in a case where three symbols are switched, the composite symbol can be configured such that the original data can be recovered as long as two symbols are read.

For individual symbols, the robustness of reading individual symbols can be improved by using highly robust symbols, for example, QR codes.

[Technology for Improving Convenience of Reading]

When the lenticular lens sheet is used to switch the appearance of symbols, the reading direction is limited. In other words, reading needs to be done while moving along the arrangement direction of the unit lenses. Therefore, indicating the reading direction can improve the convenience in reading the composite symbol. For example, a symbol indicating the reading direction is displayed adjacent to the composite symbol.

Figure 20:
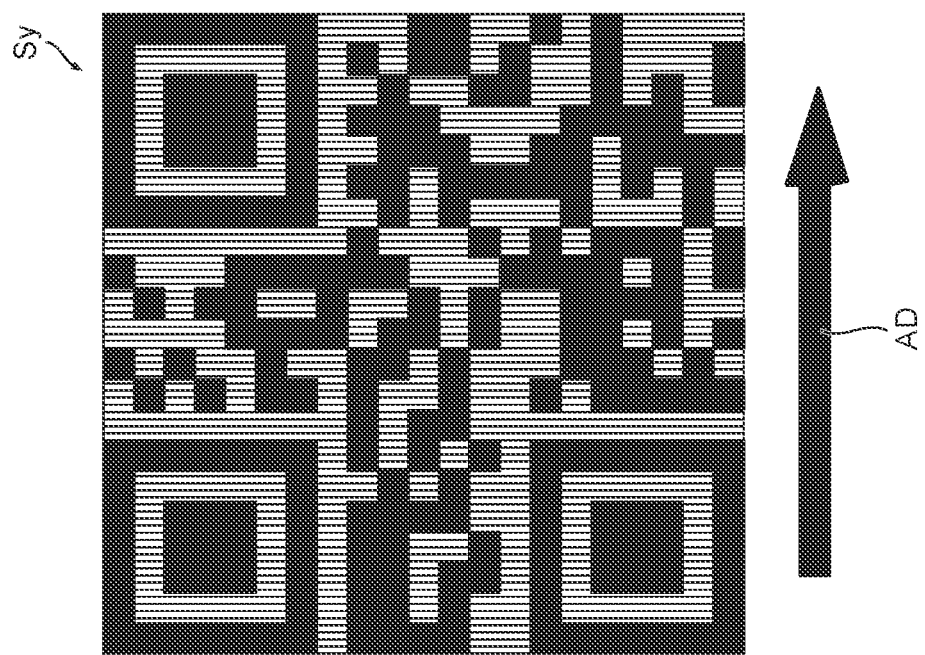
FIG. 20 is a drawing illustrating an example of a display of a sign indicating a reading direction.

FIG. 20 is a drawing illustrating an example of a display of a sign indicating a reading direction.

In the example illustrated in FIG. 20, an arrow AD is displayed (printed) adjacent to the composite symbol Sy as a symbol indicating the reading direction. By displaying such an arrow AD, the reading direction becomes clear, and the reading process becomes easier.

In addition, the composite symbol itself may be configured to show a symbol indicating the reading direction. In other words, the composite symbol is configured so that a symbol (e.g., an arrow) is displayed to indicate the reading direction in a case where the composite symbol is viewed at a certain angle.

To improve reading convenience, the composite symbol may be slid or swung, as a display format of the composite symbol.

Figure 21:
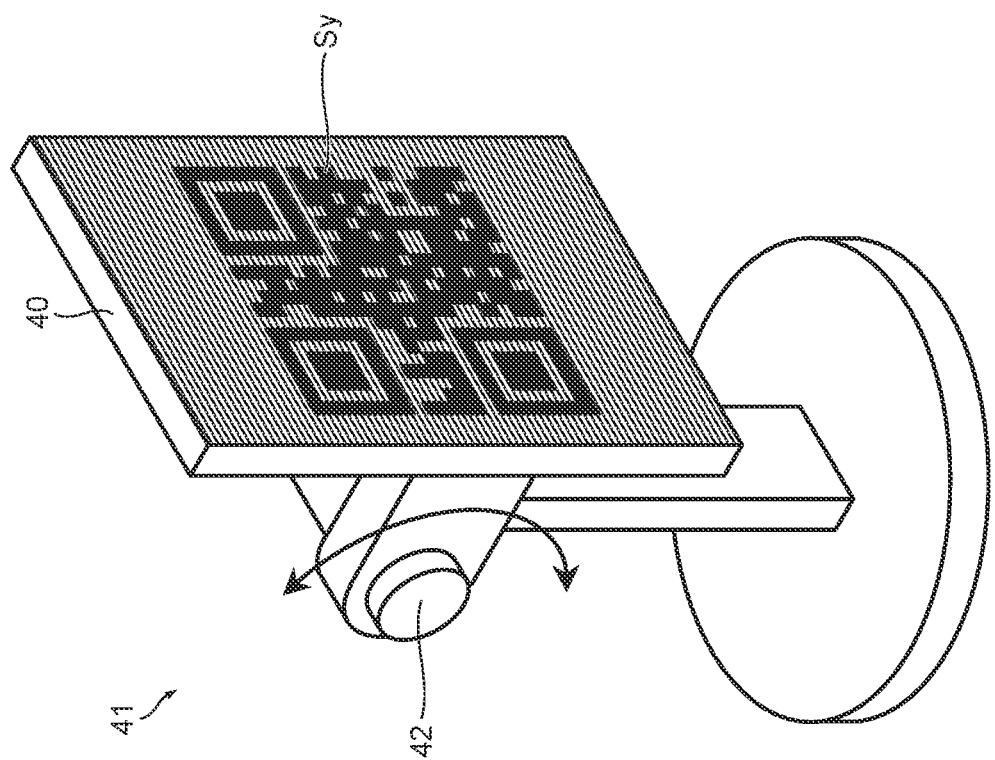
FIG. 21 is a drawing illustrating an example of a case where a composite symbol is displayed while swinging the composite symbol.

FIG. 21 is a drawing illustrating an example of a case in which a composite symbol is displayed in a swinging motion.

In the example illustrated FIG. 21, the composite symbol Sy is displayed on a display board 40, and the display board 40 is placed on a swinging stand (swingable stand) 41 so as to swing the compound symbol Sy. The stand 41 swings the display board 40 around an axis 42. The swinging mechanism may be motorized or may be configured to be swung manually in a pendulum-like manner using a weight.

In this manner, the composite symbol Sy is displayed while swinging or moving the composite symbol Sy so that a desired moving image can be captured by simply holding the reading device over the composite symbol Sy. This can improve the convenience of reading the composite symbol Sy.

[Manufacture of Composite Symbol]

In a case where a composite symbol is configured to switch the appearance using a lenticular lens sheet as described above, the lenticular image can be printed directly onto the lenticular lens sheet to produce a composite symbol. In this case, an inkjet printer can be used as printing means.

In a case where the composite symbol is printed with the inkjet method, it is preferable that the lenticular lens sheet is provided with an ink-receiving layer on a printing surface.

Figure 22:
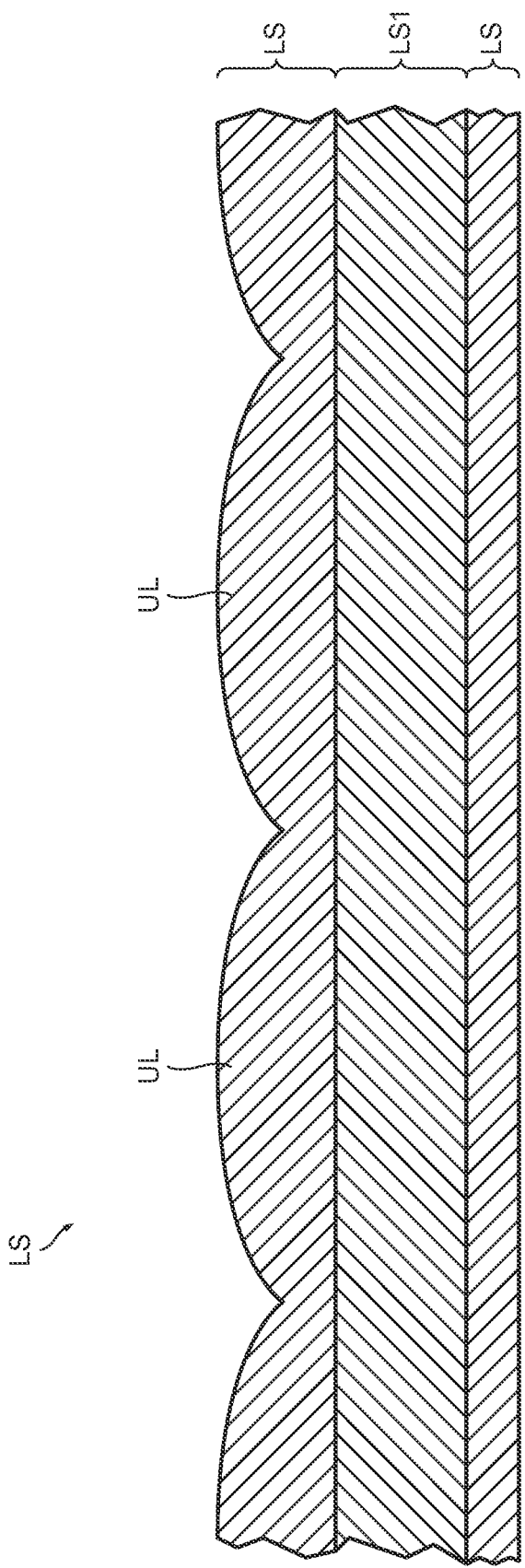
FIG. 22 is an enlarged cross-sectional view illustrating a schematic configuration of a lenticular lens sheet provided with an ink-receiving layer.

FIG. 22 is an enlarged cross-sectional view illustrating a schematic configuration of a lenticular lens sheet provided with an ink-receiving layer.

As illustrated FIG. 22, the lenticular lens sheet LS in this example is made of resin. The lenticular lens sheet LS includes a resin layer LS1 as a base material, a lens layer LS2 provided on one side of the resin layer LS1, and an ink-receiving layer LS3 provided on the other side of the resin layer LS1.

The ink-receiving layer LS3 includes particles and resin, and has a porous structure (e.g., a porosity of 50% or more). The ink-receiving layer LS3 absorbs the ink (e.g., water-based ink) that has landed thereon and immobilizes the ink inside the layer. This allows a high definition image to be formed directly on the lenticular lens sheet. By using the lenticular lens sheet LS having the ink-receiving layer LS3, the lenticular image can be printed directly onto the lenticular lens sheet LS by an inkjet printer. This eliminates the process of lamination, etc., and improves the manufacturing efficiency of composite symbols. In addition, images can be printed with high quality even in a case where high definition symbols are printed on a high-resolution lenticular lens sheet LS.

Note that, in a case where the lenticular image is printed directly on the transparent lenticular lens sheet LS, it is preferable to attach the print to a mount having high reflectivity (e.g., a white-colored mount) in order to improve the readability of the symbol. Alternatively, after printing the lenticular image, it is preferable to further paint the entire surface with white ink (so-called white backing).

[Application of Composite Symbol]

The application of composite symbols is not specifically limited. For example, the composite symbols can be used for authenticity determination of items, authenticity determination of persons, settlement processing, checking affiliation information, access control, traceability management and the like.

REFERENCE SIGNS LIST 10 smartphone (reading device)
11 CPU
12 ROM
13 RAM
14 EEPROM
16 touch panel
17 GPS receiving unit
18 camera unit
19 microphone unit
20 speaker unit
21 communication unit
21A antenna
22 short-range wireless communication unit
22A antenna
23 sensor unit
24 media drive
25 memory card
26 bus
31 moving image acquisition unit
32 symbol number information acquisition unit
33 symbol detection unit
34 decoding unit
35 authenticity determination unit
40 display board
41 stand
42 axis
AD arrow indicating reading direction
C clearance
CC chart
F image-capturing frame
IA first image
IB second image
IC third image
ID fourth image
IE fifth image
IR lenticular image
Ia strip for first image
Ib strip for second image
Ic strip for third image
Id strip for fourth image
Ie strip for fifth image
Im image
LS lenticular lens sheet
LS1 resin layer
LS2 lens layer
LS3 ink-receiving layer
MS microlens array sheet
P1 first viewpoint
P2 second viewpoint
P3 third viewpoint
PL protective layer
Sy composite symbol
Sy1 first symbol
Sy2 second symbol
Sy3 third symbol
Sy4 fourth symbol
Sy5 fifth symbol
UL unit lens
S1 to S9 procedure for reading process of composite symbol

What is claimed is:

1. A reading device comprising
at least one processor configured to:
acquire a moving image captured while moving or changing an angle relative to a composite symbol in which a plurality of symbols appear in a switching manner depending on a viewing angle with a lenticular lens sheet or a microlens array sheet, each of the symbols being configured with a code, an emergence ratio of each of the symbols differing in a case where the composite symbol is viewed while continuously changing an angle at a constant speed;
detect the symbols from the moving image; and
determine authenticity of the composite symbol based on the emergence ratio of each of the symbols detected from the moving image.

2. The reading device according to claim 1, wherein
the at least one processor decodes the detected symbols and determines authenticity of each of the symbols based on decoding results, in a case where the authenticity of the composite symbol is determined.

3. The reading device according to claim 1, wherein
the at least one processor determines the authenticity of the composite symbol based on a sequential order of the symbols detected from the moving image in chronological order.

4. The reading device according to claim 1, wherein
the at least one processor determines the authenticity of the composite symbol based on switching transition of the symbols detected from the moving image.

5. The reading device according to claim 1, wherein
the at least one processor acquires information on a number of the symbols included in the composite symbol, and terminates detection process, in a case where all the symbols included in the composite symbol are detected.

6. The reading device according to claim 5, wherein
in a case where the information on the number of symbols included in the composite symbol is stored in the symbols, the at least one processor acquires from the symbols, the information on the number of symbols included in the composite symbol.

7. The reading device according to claim 1, wherein in a case where color of the symbols switches according to switching of the symbols, the at least one processor detects switching of the color of the symbols from the moving image to detect the symbols.

8. The reading device according to claim 1, wherein in a case where band-shaped images whose color, density, or design changes according to switching of the symbol are arranged adjacently to each other in the composite symbol along a reading direction, the at least one processor detects switching of the color, density, or design of the band-shaped images to detect the symbols.

9. The reading device according to claim 1, further comprising
a display configured to display the moving image,
wherein a frame enclosing the composite symbol is superimposed on the moving image on the display.

10. A reading method comprising:
acquiring a moving image captured while moving or changing an angle relative to a composite symbol in which a plurality of symbols appear in a switching manner depending on a viewing angle with a lenticular lens sheet or a microlens array sheet, each of the symbols being configured with a code, an emergence ratio of each of the symbols differing in a case where the composite symbol is viewed while continuously changing an angle at a constant speed;
detecting the symbols from the moving image; and
determining authenticity of the composite symbol based on the emergence ratio of each of the symbols detected from the moving image.

11. A non-transitory and computer-readable recording medium which records thereon a command which causes, when read by a computer, the computer to execute a reading function comprising:
a function of acquiring a moving image captured while moving or changing an angle relative to a composite symbol in which a plurality of symbols appear in a switching manner depending on a viewing angle with a lenticular lens sheet or a microlens array sheet, each of the symbols being configured with a code, an emergence ratio of each of the symbols differing in a case where the composite symbol is viewed while continuously changing an angle at a constant speed;
a function of detecting the symbols from the moving image; and
a function of determining authenticity of the composite symbol based on the emergence ratio of each of the symbols detected from the moving image.

12. A settlement processing method based on a code, comprising:
acquiring a moving image captured while moving or changing an angle relative to a composite symbol in which a plurality of symbols appear in a switching manner depending on a viewing angle with a lenticular lens sheet or a microlens array sheet, each of the symbols being configured with the code, an emergence ratio of each of the symbols differing in a case where the composite symbol is viewed while continuously changing an angle at a constant speed;
detecting the symbols from the moving image; and
determining authenticity of the composite symbol based on the emergence ratio of each of the symbols detected from the moving image.

\* \* \* \* \*